United States Patent
Takano et al.

(10) Patent No.: US 7,356,022 B2
(45) Date of Patent: Apr. 8, 2008

(54) MOBILE COMMUNICATION SYSTEM, MOBILE STATION, BASE STATION, AND PACKET COMMUNICATION METHOD USED THEREFOR

(75) Inventors: Nahoko Takano, Tokyo (JP); Kojiro Hamabe, Tokyo (JP); Soichi Tsumura, Tokyo (JP); Mariko Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 788 days.

(21) Appl. No.: 10/689,509

(22) Filed: Oct. 21, 2003

(65) Prior Publication Data

US 2004/0125766 A1 Jul. 1, 2004

(30) Foreign Application Priority Data

Oct. 24, 2002 (JP) .............................. 2002-309368

(51) Int. Cl.
  *H04J 3/06* (2006.01)
  *H04B 7/216* (2006.01)
(52) U.S. Cl. ....................................... 370/350; 370/342
(58) Field of Classification Search ........ 370/350–352, 370/342, 320, 335, 341, 329, 333, 441, 328, 370/392, 343, 330, 331; 455/450, 509, 513, 455/452, 67.11, 461, 426, 522, 69, 445, 427, 455/423, 430, 454
See application file for complete search history.

(56) References Cited

U.S. PATENT DOCUMENTS

| | | |
|---|---|---|
| 5,566,366 A | 10/1996 | Russo et al. |
| 5,710,975 A | 1/1998 | Bernhardt et al. |
| 5,999,561 A | 12/1999 | Naden et al. |
| 6,167,270 A | 12/2000 | Rezaiifar et al. |

(Continued)

FOREIGN PATENT DOCUMENTS

EP  1 158 685 A1  11/2001

(Continued)

OTHER PUBLICATIONS

"3$^{RD}$ Generation Partnership Project; Technical Specification Group Radio Access Network; Terminal power saving features (Release 4)," 3GPP TR 25.840 V.2.3.0 (Feb. 2001); pp. 1-30 (XP-002249946).

(Continued)

*Primary Examiner*—Wing Chan
*Assistant Examiner*—Prenell Jones
(74) *Attorney, Agent, or Firm*—Foley & Lardner LLP

(57) ABSTRACT

A mobile communication system includes a base station and a mobile station. The base station includes a transmitting/receiving section that transmits/receives a packet to/from the mobile station. The base station also includes a base station state updating section that notifies the mobile station of transmission/reception state update information that indicates update of a packet receivable state in the mobile station. The mobile station includes a mobile station transmitting/receiving section that transmits/receives the packet to/from the base station. The mobile station also includes a mobile station state updating section that sets, on the basis of the transmission/reception state update information, one of an active state in which the control information for packet transmission can be received and a suspend state in which the control information for packet transmission cannot be received.

25 Claims, 27 Drawing Sheets

U.S. PATENT DOCUMENTS

| | | |
|---|---|---|
| 6,377,809 B1 | 4/2002 | Rezaiifar et al. |
| 6,463,307 B1 | 10/2002 | Larsson et al. |
| 6,526,030 B2 | 2/2003 | Rezaiifar et al. |
| 6,622,251 B1 | 9/2003 | Lindsgok et al. |
| 6,674,739 B1 * | 1/2004 | Lee et al. .................. 370/342 |
| 6,757,270 B1 * | 6/2004 | Kumar et al. ............... 370/342 |
| 2004/0127221 A1 | 7/2004 | Takano et al. |

FOREIGN PATENT DOCUMENTS

| | | |
|---|---|---|
| JP | 9-965423 | 3/1997 |
| JP | 2001-517049 A | 10/2001 |
| JP | 2002-541731 A | 12/2002 |
| JP | 2003-517741 A | 5/2003 |
| JP | 2004-147050 A | 5/2004 |
| WO | WO 02/15420 A2 | 2/2002 |

OTHER PUBLICATIONS

"3rd Generation Partnership Project; Technical Specification Group Radio Access Network; High Speed Downlink Packet Access; Physical Layer Aspects (Release 5)," 3GPP TR 25.858 V5.0.0, (Mar. 2002), pp. 1-31 (XP002249946).

3GPP TR (Technical Report) 25:858, V5. 0. 0, Mar. 2002.

3GPP TS 25.308, "3rd Generation Partnership Project; Technical Specification Group Radio Access Network; High speed Downlink Packet Access (HSDPA); Overall description," Stage 2, Release 5, Mar. 2002, pp. 9-10.

* cited by examiner

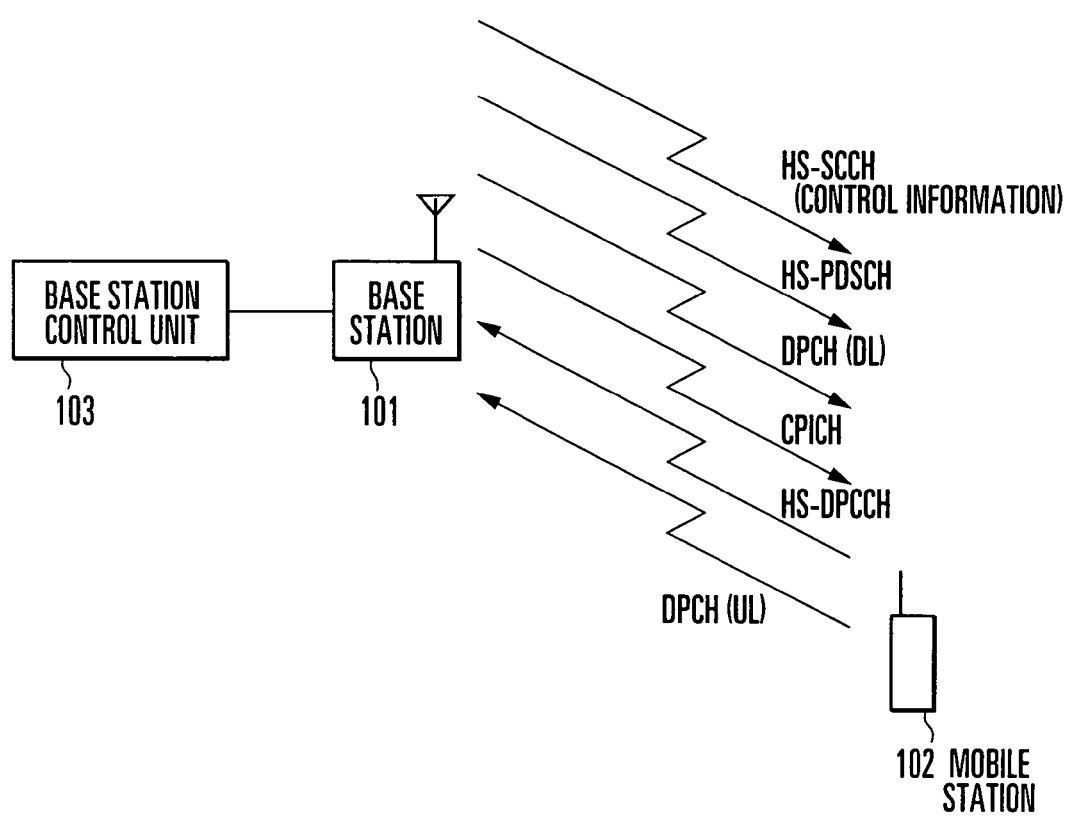
F I G. 26

MOBILE COMMUNICATION SYSTEM, MOBILE STATION, BASE STATION, AND PACKET COMMUNICATION METHOD USED THEREFOR

BACKGROUND OF THE INVENTION

The present invention relates to a mobile communication system, a mobile station, a base station, and a packet communication method used therefor and, more particularly, to a packet communication method such as an HSDPA (High-Speed Downlink Packet Access) service in a mobile communication system.

Conventionally, in an HSDPA service, DPCHs (Dedicated Physical CHannels) [DL (downlink)/UL (uplink)] are set between a mobile station 102 and a base station 101, as shown in FIG. 26. Referring to FIG. 26, a base station control unit [e.g., an RNC (Radio Network Controller)] 103 is connected to the base station 101.

As shown in FIG. 27, the mobile station 102 always receives a 4-CH (channel) HS-SCCH (High Speed Shared Control CHannel) designated from the base station 101. The mobile station 102 detects information of the mobile station ID (identifier) contained in the HS-SCCH and determines whether the ID coincides with the reception mobile station ID of the mobile station 102 that has received the channel.

Upon detecting the reception mobile station ID of the mobile station 102 that has received the channel by the HS-SCCH, the mobile station 102 receives an HS-PDSCH (High Speed Physical Downlink Shared CHannel) transmitted with a predetermined time delay from the HS-SCCH by using control information transmitted by the HS-SCCH.

When user data to be sent or data such as upper layer control information (to be referred to as dedicated physical channel data hereinafter) to be transmitted by a dedicated physical channel is generated, the mobile station 102 and base station 101 immediately transmit the data using DPCH (UL/DL) (e.g., 3GPP TR (Technical Report) 25.858, V5.0.0, March 2002).

The above-described HSDPA is a method using high-speed packet transmission in a downlink channel. In an HSDPA service receivable state, a CPICH (Common PIlot CHannel), HS-PDSCH, HS-SCCH, and DPCH (DL) are transmitted by a downlink channel. Additionally, an HS-DPCCH (High Speed Dedicated Physical Control Channel) and DPCH (UL) are transmitted by an uplink channel.

The CPICH is a pilot signal transmitted to all mobile stations in the cell managed by the base station 101. The CPICH is transmitted from the base station 101 at a predetermined power. The CPICH is used to search for a path, estimate a transmission path, and measure the DL reception quality. The HS-PDSCH is a shared channel that transmits packets of user data. The HS-PDSCH is time-multiplexed and used between a plurality of mobile stations.

The HS-SCCH is a shared channel used to transmit control data necessary for receiving a packet transmitted by the HS-PDSCH. The HS-SCCH is time-multiplexed and used between a plurality of mobile stations. Each mobile station always receives one or a plurality of HS-SCCHs. If an HS-SCCH received by a mobile station is addressed to that mobile station, the mobile station receives an HS-PDSCH packet by using the control information in the HS-SCCH.

The DPCH (DL/UL) is constituted by a DPCCH (Dedicated Physical Control CHannel) and DPDCH (Dedicated Physical Data CHannel).

The DPCCH transmits physical layer control information such as a TPC (Transmit Power Control) bit as the transmission power control information of a paired channel or TFCI (Transport Format Combination Indication) that indicates the structure of DPDCH. The DPDCH transmits user data or dedicated physical channel data such as an upper layer control signal.

An HS-DPCCH is a dedicated physical channel that transmits a CQI (Channel Quality Indication) decided from the quality measurement result of the CPICH and ACK/NACK (ACKnowledgement/Negative ACKnowledgements) as notification confirmation information of a received packet.

In the HSDPA service, even in a standby state for a packet, a channel that transmits/receives control information representing whether a packet received by the mobile station is addressed to that station must be set. For this reason, even when the packet reception time is short, the mobile station consumes the power. Especially, the high-speed packet transmission method such as HSDPA is often used for a service such as a web browsing service in which data download is intermittently repeated. Hence, even when the packet reception time is short, power consumption of a terminal is large.

Mobile stations have no idea about the timing of packet transmission from the base station. Independently of the presence/absence of packet transmission, each mobile station must receive HS-SCCH and determine whether it contains control information addressed to that mobile station. For this reason, even when no packet is received, the terminal power is consumed.

When dedicated physical channel data to be transmitted is generated, a mobile station immediately transmits the dedicated physical channel data by using a DPCH. To do this, the DPCH must be set independently of the presence/absence of packet transmission. During this time, the terminal power is consumed.

On the other hand, both the base station and mobile stations continuously transmit/receive a DPCCH (UL/DL) even when no uplink dedicated physical channel data is transmitted. Each mobile station transmits dedicated physical channel data at an arbitrary timing. For this reason, the DPCH must be set independently of the presence/absence of dedicated physical channel data transmission. During this time, the terminal power is consumed.

SUMMARY OF THE INVENTION

It is an object of the present invention to provide a mobile communication system, a mobile station, a base station, and a packet communication method used therefor, which can quickly transmit a packet in response to a data transmission request while reducing power consumption in a standby state for a packet.

In order to achieve the above object, according to the present invention, there is provided a mobile communication system comprising a base station, and a mobile station, the mobile station receiving control information that notifies the mobile station of transmission of a packet from the base station so that the mobile station can receive the packet, wherein the base station comprises a base station transmitting/receiving section which transmits/receives the packet to/from the mobile station, and a base station state updating section which notifies the mobile station of transmission/reception state update information that indicates update of a packet receivable state in the mobile station, and the mobile station comprises a mobile station transmitting/receiving section which transmits/receives the packet to/from the base station, and a mobile station state updating section which sets, on the basis of the transmission/reception state update information, one of an active state in which the control information for packet transmission can be received and a suspend state in which the control information for packet transmission cannot be received.

BRIEF DESCRIPTION OF THE DRAWINGS

FIG. 26 is a block diagram showing the configuration of a mobile communication system according to a prior art.

DESCRIPTION OF THE PREFERRED EMBODIMENTS

Figure 1:
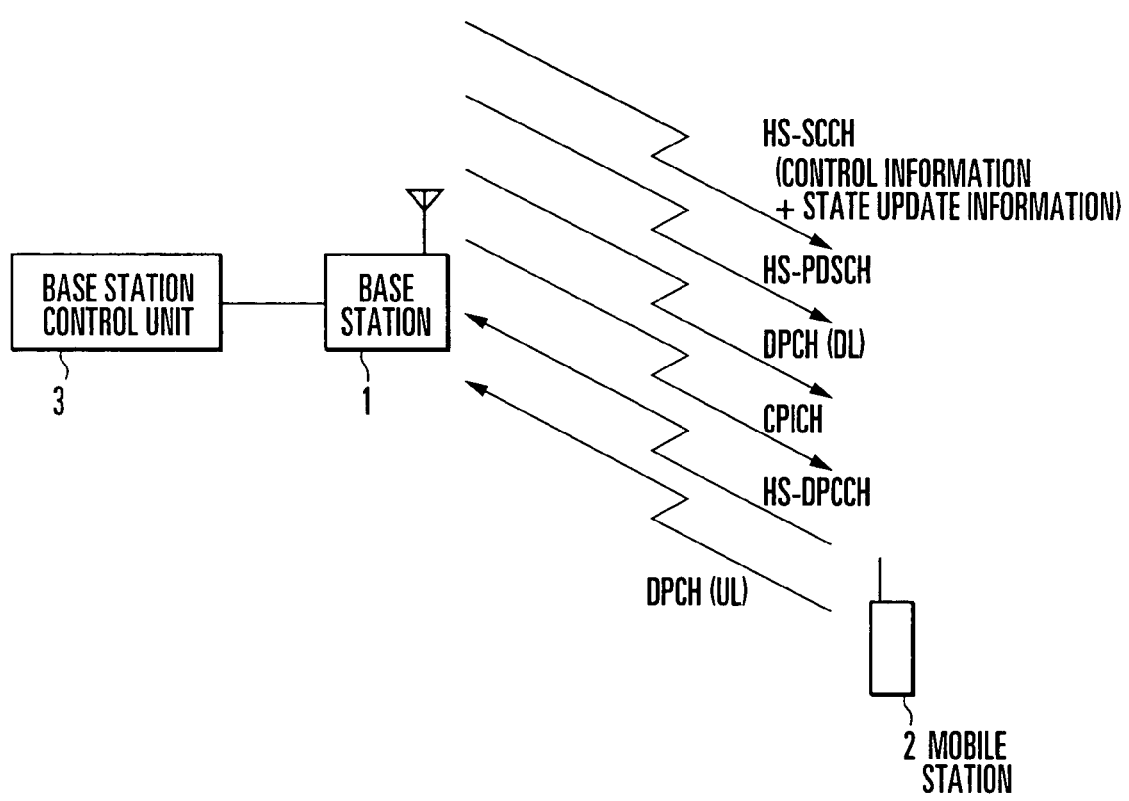
FIG. 1 is a block diagram showing the configuration of a mobile communication system according to an embodiment of the present invention.

An embodiment of the present invention will be described next with reference to the accompanying drawings. The configuration of a mobile communication system according to the embodiment of the present invention will be described with reference to FIG. 1. The mobile communication system according to the embodiment of the present invention comprises a base station 1, a mobile station 2, and a base station control unit [e.g., RNC (Radio Network Controller)] 3 connected to the base station 1.

The mobile station 2 always receives a 4-CH (channel) HS-SCCH (High Speed Shared Control CHannel) designated from the base station 1. The mobile station 2 detects information of the mobile station ID (identifier) contained in the HS-SCCH and determines whether the ID coincides with the reception mobile station ID of the mobile station that has received the channel.

Upon detecting the mobile station ID of the mobile station that has received the channel by the HS-SCCH, the mobile station 2 receives an HS-PDSCH (High Speed Physical Downlink Shared CHannel) transmitted with a predetermined time delay from the HS-SCCH by using control information transmitted by the HS-SCCH.

In this embodiment, the base station 1 sends, to the mobile station 2 by using the HS-SCCH, not only the above control information but also transmission/reception state update information (a signal that notifies the state of the mobile station 2 in the current state update frame) (to be referred to as state update information hereinafter) that instructs a state [active/suspend] in a preset state update frame (e.g., a unit frame that controls the state of the mobile station 2 at a period of 100 sec).

In the active state, the mobile station 2 can receive normal HSDPA (High-Speed Downlink Packet Access). That is, in the active state, control information necessary for packet transmission can be received, and power supplies to all circuits are ON.

In the suspend state, the mobile station 2 cannot receive HSDPA. A power consumption saving mode is set, in which power supplies to circuits related to the HSDPA reception are OFF.

Hence, the state (mode) of the mobile station 2 in its state update frame is set on the basis of state update information sent from the base station 1 at a preset period (predetermined interval).

The suspend state is set except when the mobile station 2 receives a packet or transmits user data or data (to be referred to as dedicated physical channel data hereinafter) [control information (various kinds of control information such as application, channel change, and handover) for a layer on the upper side of L (Layer) 1] such as upper layer control information to be transmitted by a dedicated physical channel. Accordingly, a packet can be quickly transmitted in response to a data transmission request while reducing the power consumption in the standby state for a packet.

Figure 2:
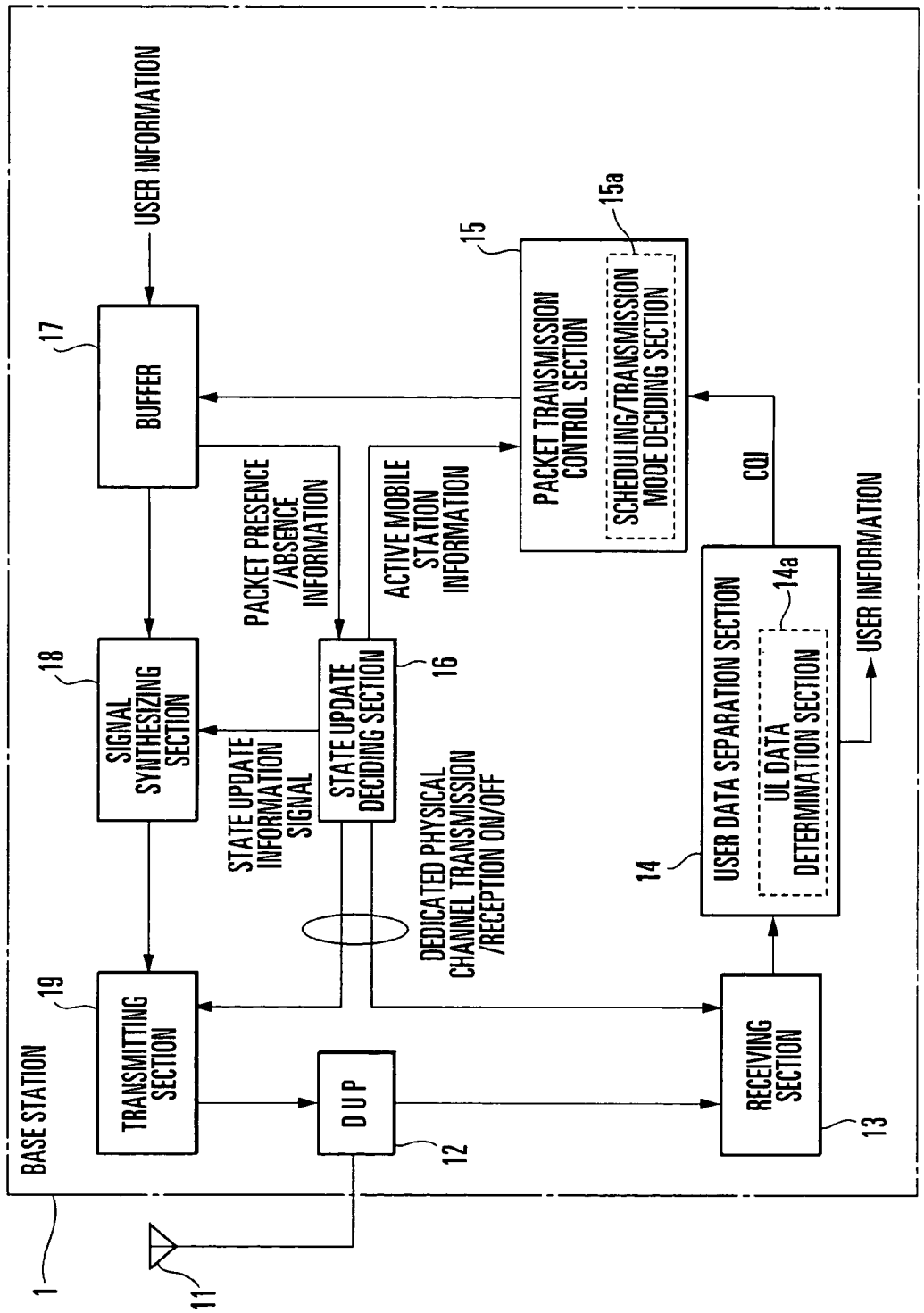
FIG. 2 is a block diagram showing the arrangement of a base station according to the first embodiment of the present invention.

The arrangement of the base station according to the first embodiment of the present invention will be described next with reference to FIG. 2. Referring to FIG. 2, the base station 1 comprises an antenna 11, a transmission/reception duplexer (DUP) 12 connected to the antenna 11, a receiving section 13 connected to the transmission/reception duplexer 12, a user data separation section 14 connected to the receiving section 13, a packet transmission control section 15 connected to the user data separation section 14, and a state update deciding section 16 connected to the receiving section 13 and packet transmission control section 15.

The base station 1 also comprises a buffer 17 connected to the packet transmission control section 15 and state update deciding section 16, a signal synthesizing section 18 connected to the buffer 17, and a transmitting section 19 connected to the signal synthesizing section 18, transmission/reception duplexer 12, and state update deciding section 16.

Known techniques can be applied to the call control part, voice input/output part, and display part of the base station 1, and a description of the arrangements and operations thereof will be omitted.

The receiving section 13 sends, to the user data separation section 14, a signal [DPCH (UL)] received through the antenna 11 and transmission/reception duplexer 12.

The user data separation section 14 has a UL data determination section 14a. The user data separation section 14 separates the reception signal from the receiving section 13 into user information (voice signal, image signal, and the like) and control information [CQI (Channel Quality Indication)]. The user information is sent to the above-described call control part, voice output part, and display part of the base station 1. The control information is sent to the packet transmission control section 15. The UL data determination section 14a confirms that the DPDCH (UL) is transmitted.

The packet transmission control section 15 has a scheduling/transmission mode deciding section 15a. The packet transmission control section 15 executes transmission control for the packet temporarily stored in the buffer 17 on the basis of the CQI from the user data separation section 14 and the active mobile station information from the state update deciding section 16. The scheduling/transmission mode deciding section 15a decides the scheduling/transmission mode on the basis of the CQI information of the mobile station 2.

The state update deciding section 16 decides on the basis of the presence/absence information of the packet temporarily stored in the buffer 17 whether the mobile station 2 should be set in the active state or suspend state. In accordance with the decision result, the state update deciding section 16 sends active mobile station information to the packet transmission control section 15, a state update information signal (state update information to the mobile station 2) to the signal synthesizing section 18, and a dedicated physical channel transmission/reception ON/OFF signal to the receiving section 13 and transmitting section 19.

The buffer 17 temporarily stores user information (packet). The signal synthesizing section 18 synthesizes the user information (packet) temporarily stored in the buffer 17 and the state update information signal from the state update deciding section 16 and sends them as an HS-SCCH, DPCH (Dedicated Physical CHannel) (DL: downlink), and HS-PDSCH from the antenna 11 through the transmitting section 19 and transmission/reception duplexer 12.

Figure 3:
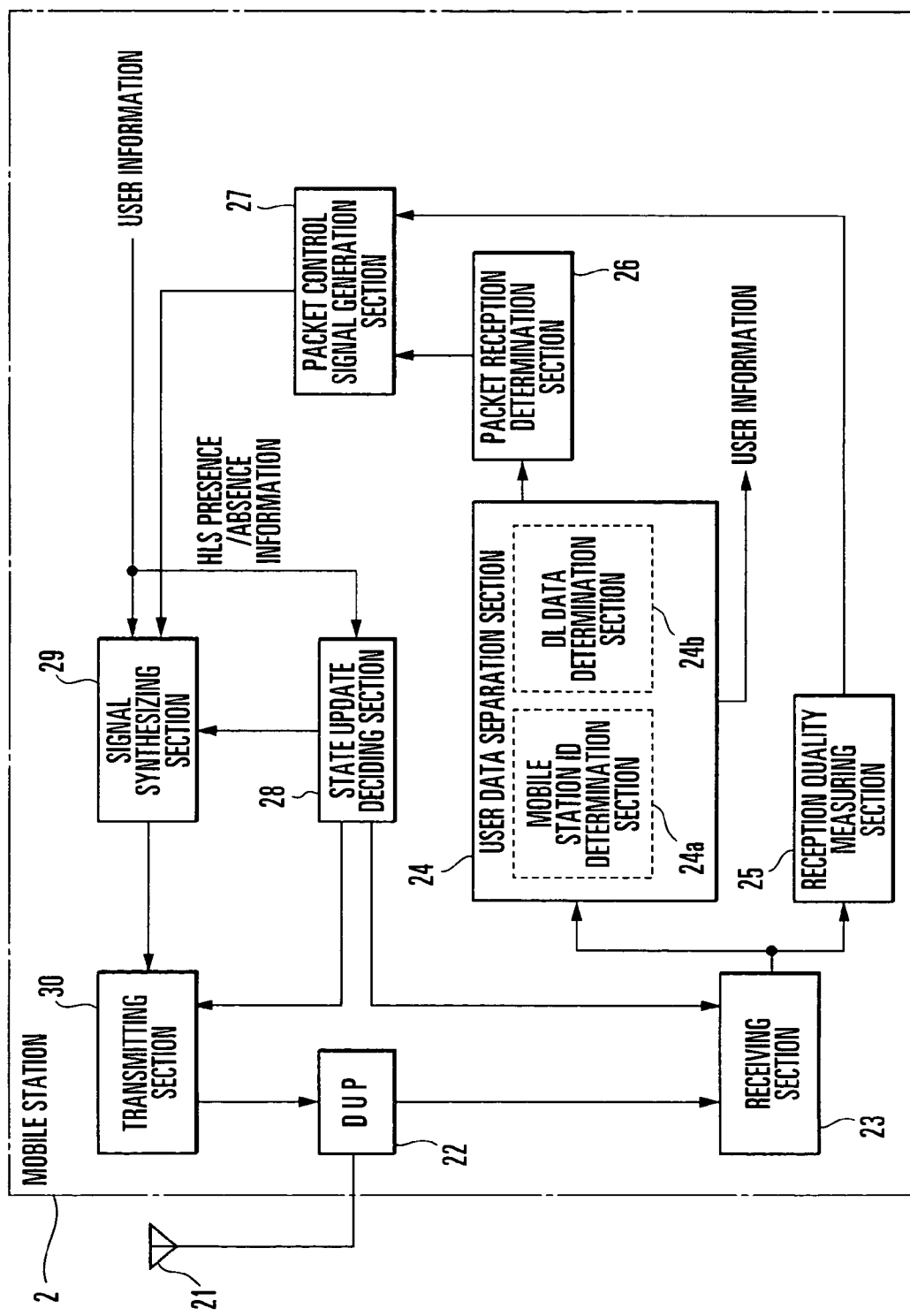
FIG. 3 is a block diagram showing the arrangement of a mobile station according to the first embodiment of the present invention.

The arrangement of the mobile station according to the first embodiment of the present invention will be described next with reference to FIG. 3. Referring to FIG. 3, the mobile station 2 comprises an antenna 21, a transmission/reception duplexer (DUP) 22 connected to the antenna 21, a receiving section 23 connected to the transmission/reception duplexer 22, a user data separation section 24 connected to the receiving section 23, a reception quality measuring section 25 connected to the receiving section 23, and a packet reception determination section 26 connected to the user data separation section 24.

The mobile station 2 also comprises a packet control signal generation section 27 connected to the packet reception determination section 26 and reception quality measuring section 25, a state update deciding section 28 connected to the user data separation section 24 and receiving section 23, a signal synthesizing section 29 connected to the packet control signal generation section 27, and a transmitting section 30 connected to the signal synthesizing section 29, state update deciding section 28, and transmission/reception duplexer 22.

Known techniques can be applied to the call control part, voice input/output part, and display part of the mobile station 2, and a description of the arrangements and operations thereof will be omitted.

The receiving section 23 sends, to the user data separation section 24, a signal [CPICH (Common PIlot CHannel), DPCH (DL), and HS-PDSCH] received through the antenna 21 and transmission/reception duplexer 22.

The user data separation section 24 has a mobile station ID determination section 24a and DL data determination section 24b. The user data separation section 24 separates the reception signal from the receiving section 23 into user information (voice signal, image signal, and the like) and control information. The user information is sent to the above-described call control part, voice output part, and display part of the mobile station 2. The control information is sent to the packet reception determination section 26 and state update deciding section 28.

The mobile station ID determination section 24a detects the information of the mobile station ID contained in the HS-SCCH and determines whether the mobile station ID coincides with the reception mobile station ID of the mobile station that has received the HS-SCCH.

The DL data determination section 24b determines whether transmission of a DPDCH (DL) is present.

The reception quality measuring section 25 measures the reception quality [Ec/Io (energy per chip/interference wave power per unit frequency)] of the CPICH from the receiving section 23 and outputs the measurement result to the packet control signal generation section 27.

The packet reception determination section 26 determines on the basis of the control information from the user data separation section 24 whether the control information (a signal to send a notification of the packet transmission timing) of the HS-SCCH is present or whether the packet from the base station 1 is normally received. The packet reception determination section 26 outputs the determination result to the packet control signal generation section 27.

The packet control signal generation section 27 generates ACK/NACK (ACKnowledgement/Negative ACKnowledgements) as notification confirmation information of the received packet on the basis of the determination result from the packet reception determination section 26 and a CQI on the basis of the measurement result from the reception quality measuring section 25 and outputs the ACK/NACK and CQI to the signal synthesizing section 29.

On the basis of the control information from the user data separation section 24 and the dedicated physical channel data presence/absence information in the user information input to the signal synthesizing section 29, the state update deciding section 28 decides the state (active/suspend) in the state update frame and transmits the state to the receiving section 23 and transmitting section 30.

The signal synthesizing section 29 synthesizes the information (ACK/NACK and CQI) from the packet control signal generation section 27 and an external input signal from the call control part or voice input part of the mobile station 2 and sends them as a DPCH (UL) and HS-DPCCH from the antenna 21 through the transmitting section 30 and transmission/reception duplexer 22.

The operation of the mobile communication system according to the first embodiment of the present invention will be described with reference to FIGS. 1 to 9.

Premises of the first embodiment of the present invention are as follows. As a condition of the mobile station 2 to be set in the active state, "a packet to be transmitted to the base station 1 has arrived at the mobile station 2". No reception confirmation of active notification is done. If the mobile station 2 cannot properly receive state update information, the mobile station 2 is set in the active state independently of the contents of the state update information.

Figure 4:
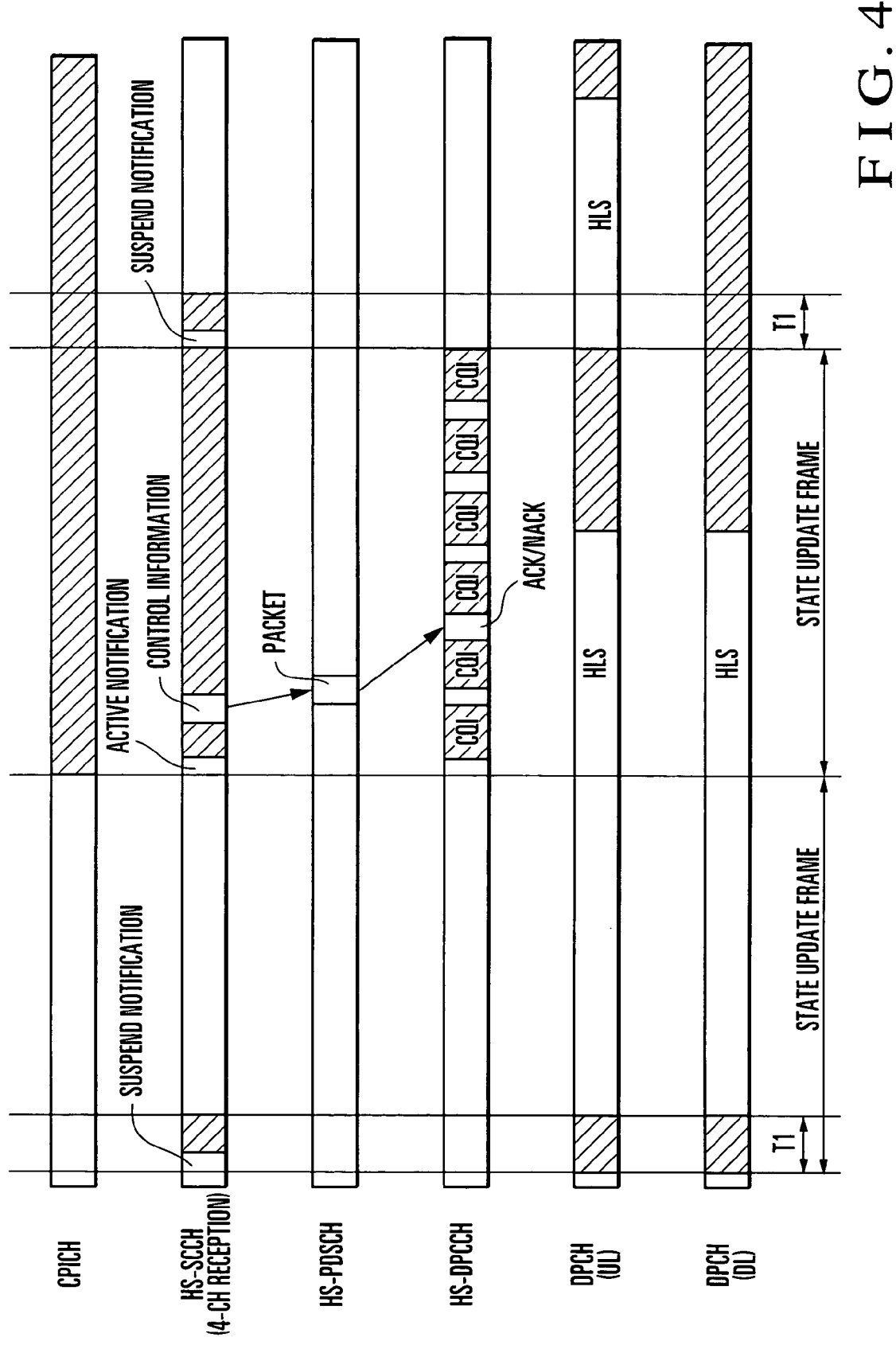
FIG. 4 is a view showing the flow of signals transmitted/received between the base station shown in FIG. 2 and the mobile station shown in FIG. 3.

In this case, to confirm the presence/absence of dedicated physical channel data [HLS (Higher Layer Signaling) shown in FIG. 4] (UL) when the suspend state is designated, a method of "measuring the power ratio of DPDCH and DPCCH (UL) and making determination" or a method of "sending a notification as the contents of a TFCI (Transport Format Combination Indication) by using a format containing the TFCI" is used. In this embodiment, the method is not particularly mentioned. The TFCI indicates the structure of DPDCH.

Figure 5:
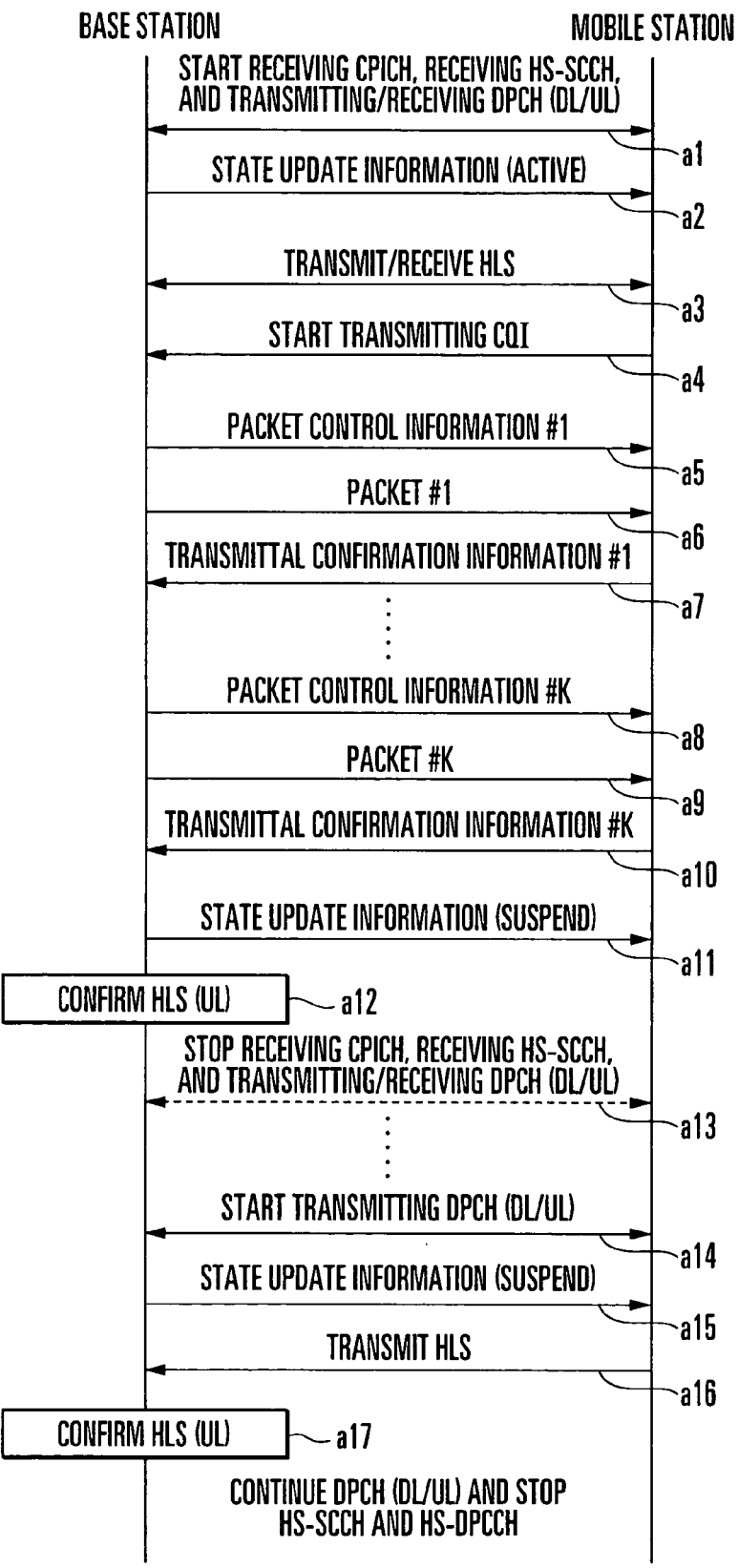
FIG. 5 is a sequence chart showing the operation of the mobile communication system according to the first embodiment of the present invention.
Figure 6:
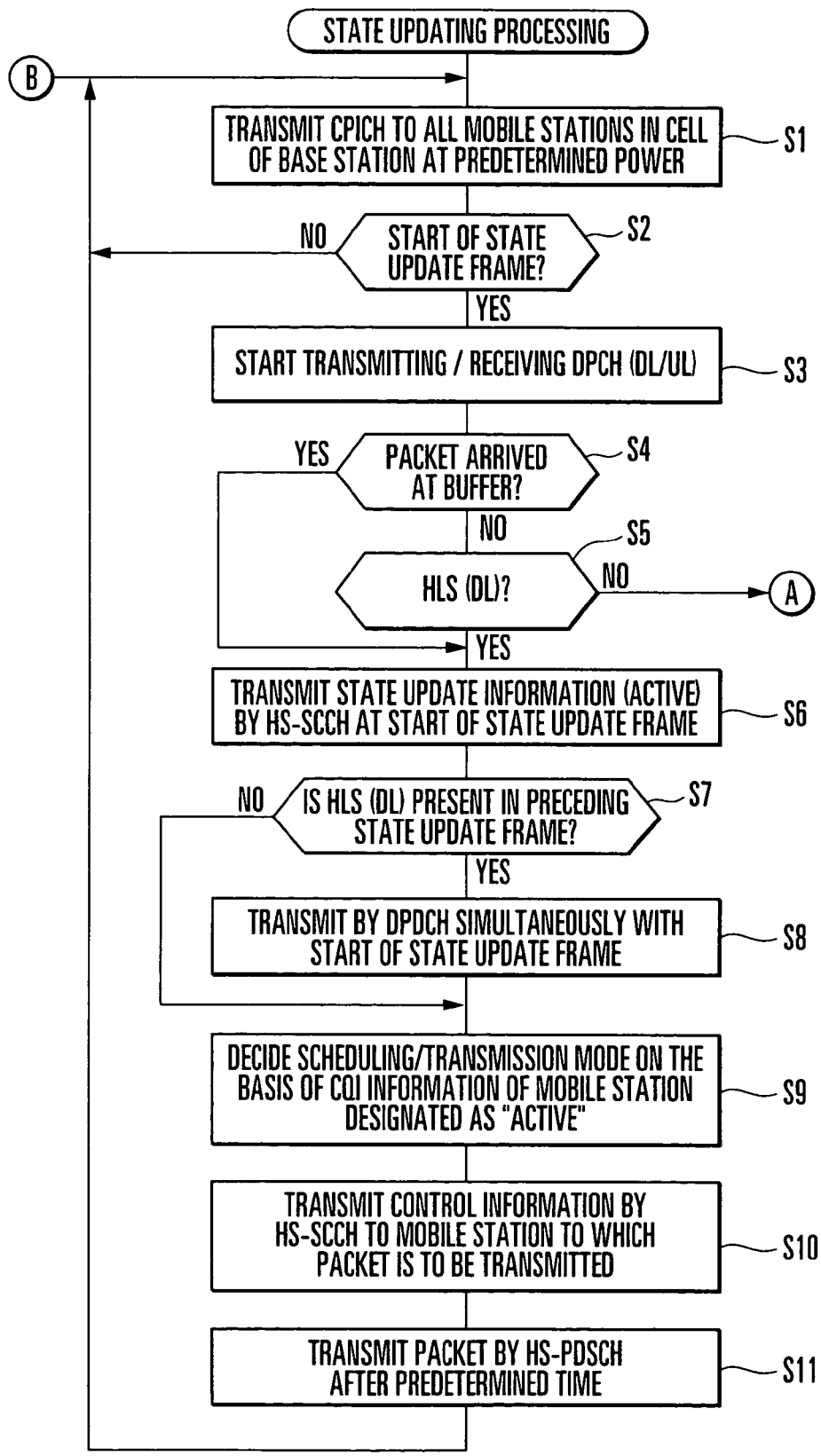
FIG. 6 is a flow chart showing the operation of the base station shown in FIG. 2.

The transmitting section 19 of the base station 1 transmits a CPICH to all mobile stations in the cell managed by the base station 1 at a predetermined power (step S1 in FIG. 6). Simultaneously with the start of the state update frame (step S2 in FIG. 6), the transmitting section 19 of the base station 1 starts transmitting a DPCH (DL) and receiving a DPCH (UL) (step S3 in FIG. 6) (a1 in FIG. 5).

Simultaneously with the start of the state update frame at a predetermined interval (step S21 in FIG. 8), the receiving section 23 and transmitting section 30 of the mobile station 2 start receiving a CPICH, receiving a DPCH (DL) and transmitting a DPCH (UL), and receiving an HS-SCCH (step S22 in FIG. 8) (a1 in FIG. 5).

When at least one of the conditions, i.e., arrival of a packet at the buffer 17 (step S4 in FIG. 6) and the presence of dedicated physical channel data (DL) is satisfied (step S5 in FIG. 6), the state update deciding section 16 of the base station 1 transmits state update information (active) by HS-SCCH at the start of the state update frame (step S6 in FIG. 6) (a2 in FIG. 5).

Figure 8:
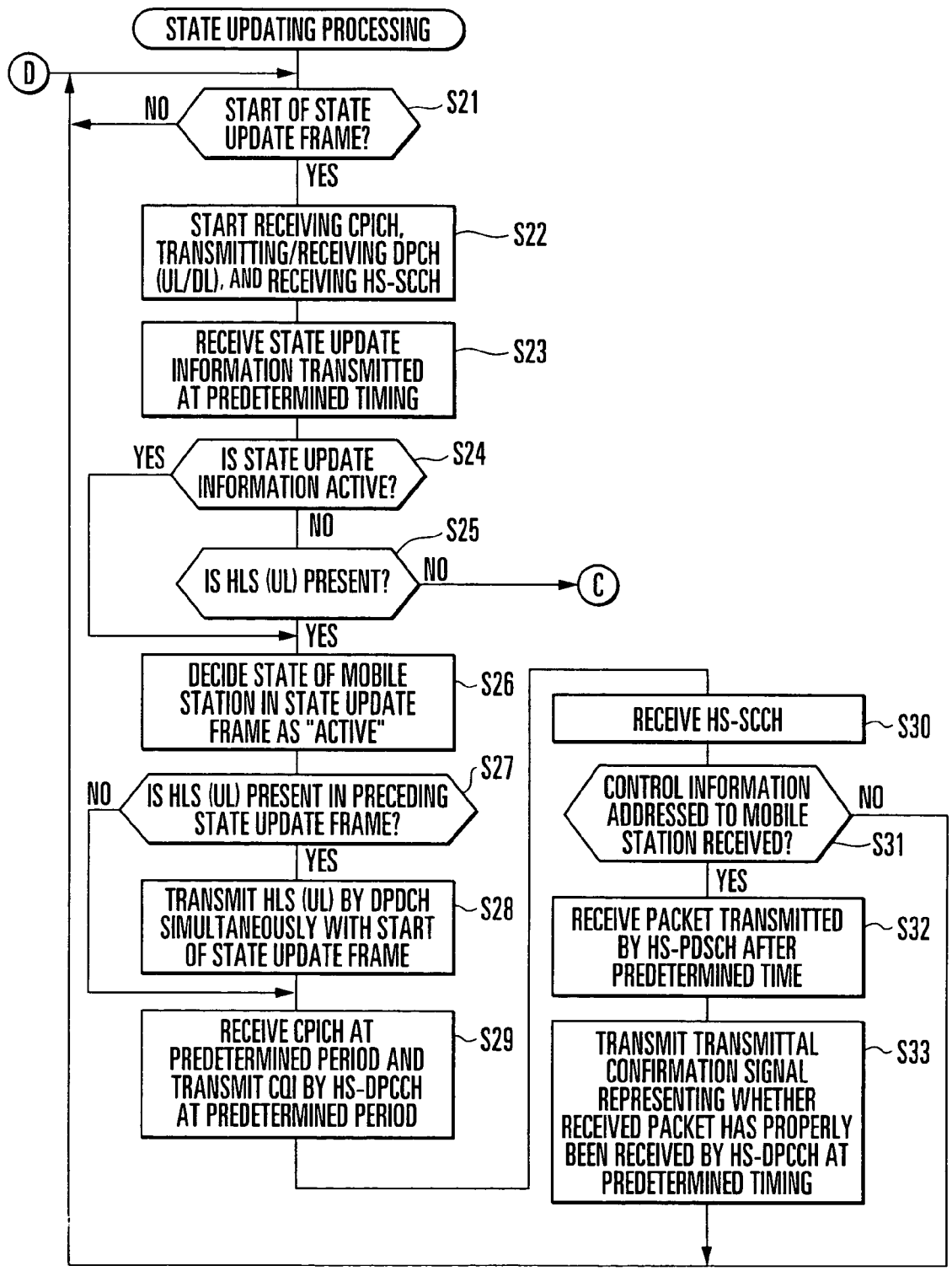
FIG. 8 is a flow chart showing the operation of the mobile station shown in FIG. 3.

The receiving section 23 of the mobile station 2 receives the state update information transmitted at a predetermined timing (step S23 in FIG. 8). When at least one of the conditions, i.e., active designation in the state update information (step S24 in FIG. 8) and the presence of dedicated physical channel data (UL) is satisfied (step S25 in FIG. 8), the state update deciding section 28 decides the state in this state update frame as "active" (step S26 in FIG. 8).

When dedicated physical channel data is present, both the mobile station 2 and the base station 1 transmit the dedicated physical channel data by the DPDCH simultaneously with the start of the next state update frame. In other words, when dedicated physical channel data (DL/UL) is present in the preceding state update frame (step S7 in FIG. 6 and step S27 in FIG. 8), the transmitting section 19 of the base station 1 and the transmitting section 30 of the mobile station 2 transmit the dedicated physical channel data (DL/UL) by the DPDCH simultaneously with the start of the state update frame (step S8 in FIG. 6 and step S28 in FIG. 8) (a3 in FIG. 5).

After this, when the state update deciding section 16 of the base station 1 instructs "active", and the state update deciding section 28 of the mobile station 2 decides "active", the receiving section 23 of the mobile station 2 receives the CPICH at a predetermined period. Then, the packet control signal generation section 27 of the mobile station 2 generates a CQI as DL reception quality information. The signal synthesizing section 29 transmits the generated CQI by an HS-DPCCH at a predetermined period (step S29 in FIG. 8) (a4 in FIG. 5).

In addition, the receiving section 23 and transmitting section 30 of the mobile station 2 continuously receive the HS-SCCH and transmit/receive the DPCH (DL/UL) so as to maintain the packet receivable state.

On the basis of the CQI information of the mobile station 2 designated as "active", the scheduling/transmission mode deciding section 15a of the base station 1 decides the scheduling/transmission mode (step S9 in FIG. 6).

The transmitting section 19 of the base station 1 transmits, by the HS-SCCH, control information to the mobile station 2 to which the packet is to be transmitted (step S10 in FIG. 6) (a5 in FIG. 5). After a predetermined time, the transmitting section 19 transmits the packet by the HS-PDSCH (step S11 in FIG. 6) (a6 in FIG. 5).

The receiving section 23 of the mobile station 2 receives the HS-SCCH (step S30 in FIG. 8). The mobile station ID determination section 24a of the mobile station 2 detects the information of the mobile station ID contained in the received HS-SCCH and determines whether the mobile station ID coincides with the reception mobile station ID of the mobile station 2 that has received the HS-SCCH.

When control information addressed to the mobile station 2 is received (step S31 in FIG. 8), i.e., when the mobile station ID coincides with the reception mobile station ID, the mobile station 2 receives the packet that is transmitted by the HS-PDSCH after the predetermined time (step S32 in FIG. 8).

Then, the packet reception determination section 26 of the mobile station 2 determines whether the packet is properly received. If the packet reception determination section 26 determines that the packet is properly received, the packet control signal generation section 27 transmits a transmittal confirmation signal by an HS-DPCCH at a predetermined timing (step S33 in FIG. 8) (a7 in FIG. 5). The packet transmission/reception processing is repeatedly executed until the last packet is transmitted/received (a8 to a10 in FIG. 5).

Assume that the state update deciding section 16 of the base station 1 instructs "suspend", and the state update deciding section 28 of the mobile station 2 decides "suspend". That is, when no packet arrives at the buffer 17 (step S4 in FIG. 6), and no dedicated physical channel data (DL) is present (step S5 in FIG. 6), the base station 1 transmits state update information (suspend) by the HS-SCCH at the start of the state update frame (step S12 in FIG. 7) (a11 in FIG. 5).

Figure 7:
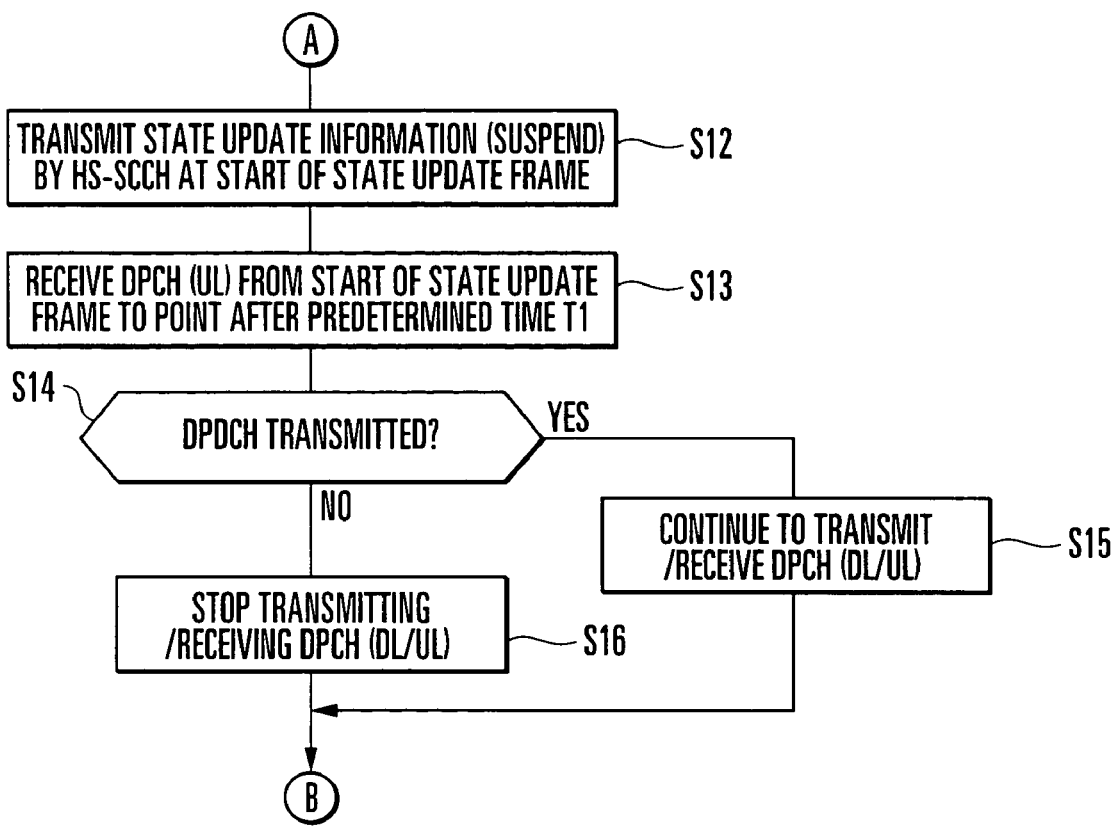
FIG. 7 is a flow chart showing the operation of the base station shown in FIG. 2.

Subsequently, the receiving section 13 of the base station 1 receives the DPCH (UL) from the start of the state update frame to a point after predetermined time T1 (step S13 in FIG. 7). That no DPDCH is transmitted is confirmed (step S14 in FIG. 7) (a12 in FIG. 5). After that, transmission of the DPCH (DL) and reception of the DPCH (UL) are stopped (step S16 in FIG. 7) (a13 in FIG. 5).

The scheduling/transmission mode deciding section 15a of the base station 1 does not schedule packet transmission to the mobile station 2 in this state update frame.

The receiving section 23 of the mobile station 2 receives the state update information transmitted at a predetermined timing (step S23 in FIG. 8). When the received state update information does not designate the active state (step S24 in FIG. 8), and no dedicated physical channel data (UL) is present (step S25 in FIG. 8), the state update deciding section 28 decides the state in this state update frame as "suspend" (step S34 in FIG. 9).

Figure 9:
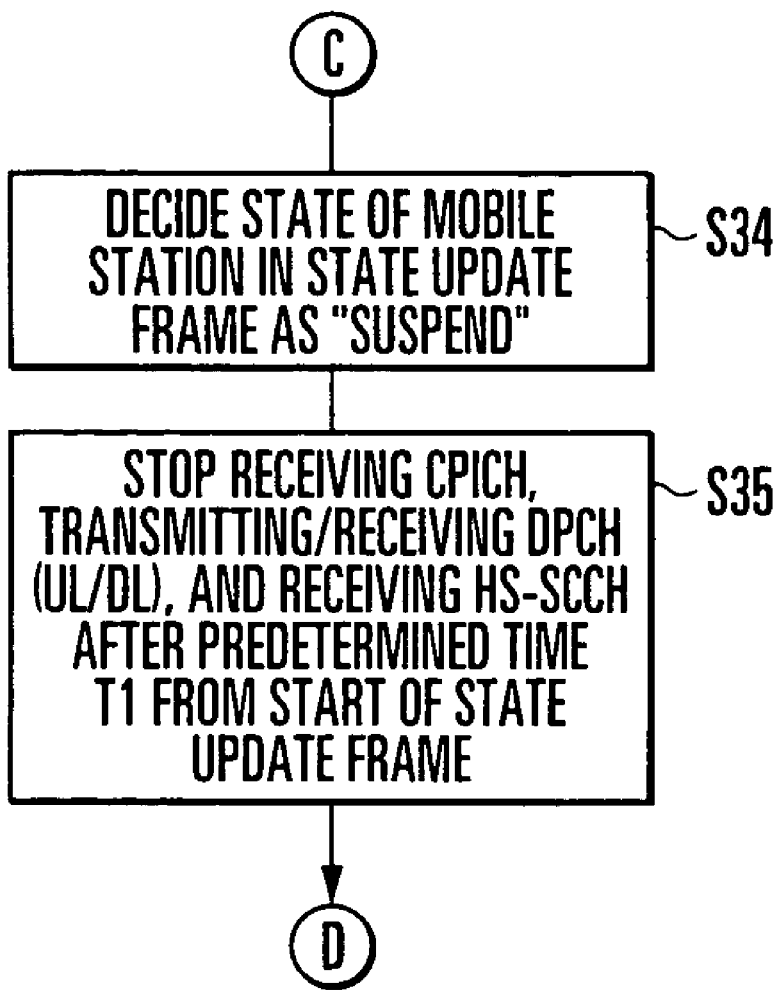
FIG. 9 is a flow chart showing the operation of the mobile station shown in FIG. 3.

The receiving section 23 and transmitting section 30 of the mobile station 2 stop receiving the CPICH, receiving the DPCH (DL) and transmitting the DPCH (UL), and receiving the HS-SCCH the predetermined time T1 after the start of the state update frame, (step S35 in FIG. 9).

Assume that the state update deciding section 16 of the base station 1 instructs "suspend", and the state update deciding section 28 of the mobile station 2 decides "active". That is, when no packet arrives at the buffer 17 (step S4 in FIG. 6), and no dedicated physical channel data (DL) is present (step S5 in FIG. 6), the state update deciding section 16 of the base station 1 transmits state update information (suspend) by the HS-SCCH at the start of the state update frame (step S12 in FIG. 7) (a14 in FIG. 5).

Subsequently, the receiving section 13 of the base station 1 receives the DPCH (UL) from the start of the state update frame to a point after the predetermined time T1 (step S13 in FIG. 7). The UL data determination section 14a of the base station 1 confirms that the DPDCH (UL) has been transmitted (step S14 in FIG. 7) (a17 in FIG. 5). After that, the receiving section 13 and transmitting section 19 of the base station 1 continue to transmit the DPCH (DL) and receive the DPCH (UL) (step S15 in FIG. 7).

Since dedicated physical channel data (DL/UL) is present in the preceding state update frame (step S27 in FIG. 8), the mobile station 2 transmits the dedicated physical channel data (UL) by the DPDCH simultaneously with the start of the state update frame (step S28 in FIG. 8) (a16 in FIG. 5).

The receiving section 23 and transmitting section 30 of the mobile station 2 stop receiving the HS-SCCH and transmitting the HS-DPCCH the predetermined time T1 after the start of the state update frame.

Even transmission of the dedicated physical channel data (DL/UL) is ended, both the base station 1 and the mobile station 2 continue to transmit/receive the DPCH (DL/UL) until the next state update frame. FIG. 4 shows the flow of the above-described signals.

The operations of the base station 1 and mobile station 2 have been described above. As an exceptional case, a communication error may occur in the propagation channel between the base station 1 and the mobile station 2. More specifically, although the state update deciding section 16 of the base station 1 instructs "active", the mobile station 2 may not be able to properly receive the state update information.

In this case, the scheduling/transmission mode deciding section 15a of the base station 1 decides the scheduling/transmission mode on the basis of the CQI information of the mobile station 2 designated as "active". Subsequently, the transmitting section 19 of the base station 1 transmits, by the HS-SCCH, control information to the mobile station 2 to which the packet is to be transmitted. After a predetermined time, the transmitting section 19 transmits the packet by the HS-PDSCH.

On the other hand, since an error has occurred in receiving the state update information, the state update deciding section 28 of the mobile station 2 decides the state in the state update frame as "active" independently of the contents of the state update information. Reception of the HS-SCCH, transmission/reception of the DPCH (DL/UL), and transmission of the HS-DPCCH are continued to maintain the packet receivable state.

As described above, in this embodiment, the mobile station 2 is set in the suspend state except when receiving a packet or transmitting/receiving dedicated physical channel data. Hence, the power consumption of the mobile station 2 can be reduced. Especially, in packet communication, data is transmitted by burst transmission, and the data non-transmission time is long. For this reason, a large power consumption reducing effect can be obtained for the mobile station 2 by stopping transmission/reception.

In this embodiment, in the suspend state, the base station 1 stops one or both of DPCH (DL) transmission and DPCH (UL) reception. Accordingly, the transmission power assigned to the DPCH can be reduced while the power assigned to the HS-PDSCH can be increased. Since the transmission power can be assigned to another mobile station, the system throughput can be increased.

In this embodiment, if the mobile station 2 cannot properly receive transmission/reception state update information, the mobile station is set in the active state independently of the contents of the state update information. Accordingly, even when the base station 1 transmits an active notification, and the mobile station 2 fails to receive the notification, a packet can be transmitted/received. Hence, the user throughput can be increased. In this case, since wasteful packet transmission can also be avoided, the system throughput can be increased.

Figure 10:
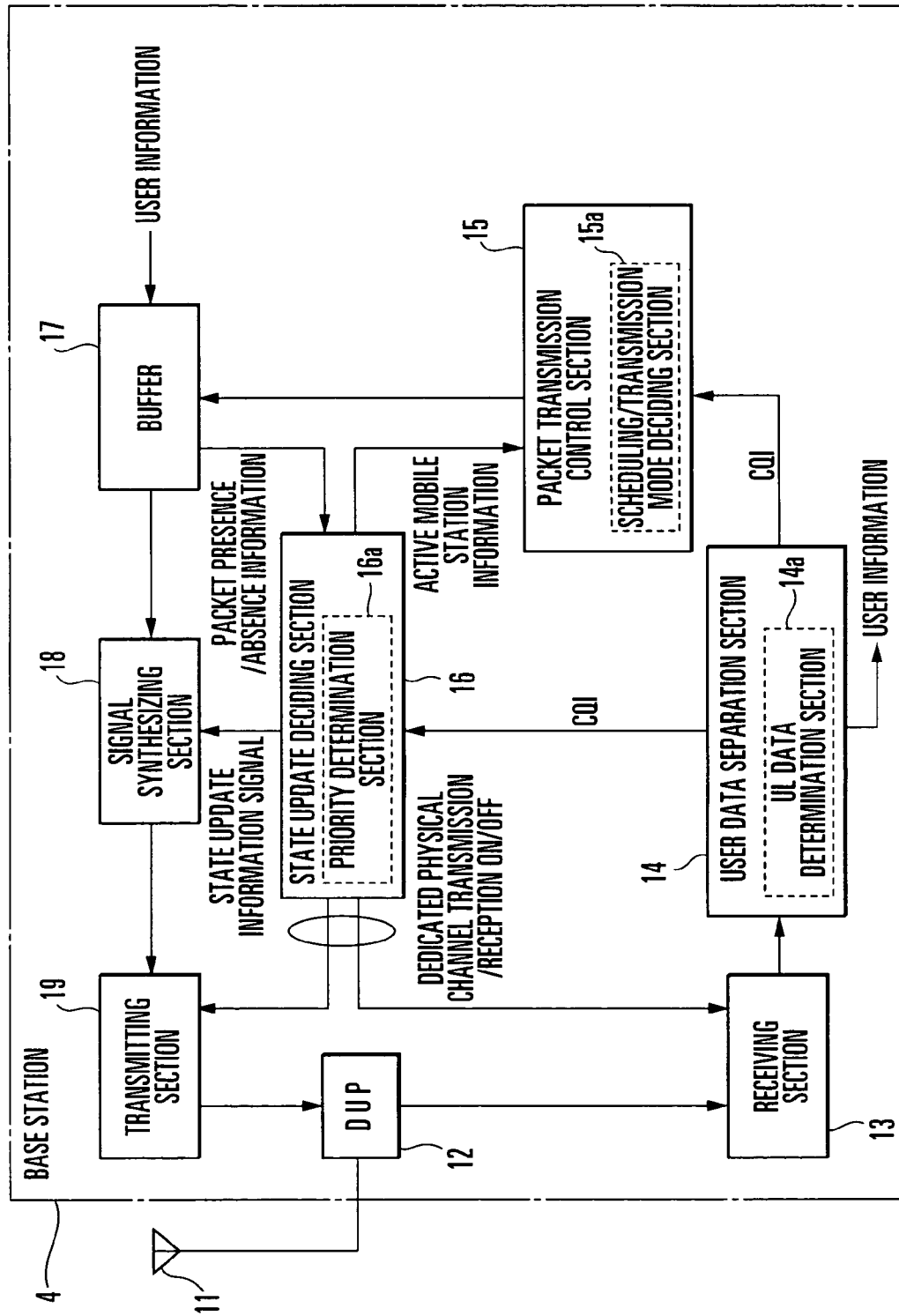
FIG. 10 is a block diagram showing the arrangement of a base station according to the second embodiment of the present invention.

The arrangement of a base station according to the second embodiment of the present invention will be described next with reference to FIG. 10. In a base station 4 according to the second embodiment of the present invention, a user data separation section 14 is connected to a state update deciding section 16. A CQI is sent from the user data separation section 14 to the state update deciding section 16.

The remaining components have the same arrangement as that of the base station 1 according to the first embodiment of the present invention shown in FIG. 2. The same reference numerals as in FIG. 2 denote the same constituent elements in FIG. 10. The operations of the same constituent elements except the user data separation section 14 and state update deciding section 16 are the same as in the first embodiment of the present invention.

The state update deciding section 16 also uses CQI information transmitted from a mobile station 2 in advance. The state update deciding section 16 decides on the basis of the CQI information and the presence/absence information of a packet temporarily stored in a buffer 17 whether the mobile station 2 is to be set in the active state or suspend state.

In accordance with the decision result, the state update deciding section 16 sends active mobile station information to a packet transmission control section 15, a state update information signal (state update information to the mobile station 2) to a signal synthesizing section 18, and a dedicated physical channel transmission/reception ON/OFF signal to a receiving section 13 and transmitting section 19.

Accordingly, in the second embodiment of the present invention, the state update deciding section 16 of the mobile station 2 transmits the CQI immediately before a state update frame.

The state update deciding section 16 of the base station 4 has a priority determination section 16a which determines the mobile station 2 for which the packet transmission priority estimated by the CQI has a predetermined value or less. Since the priority determination section 16a is arranged, the state update deciding section 16 can send a suspend notification to the mobile station 2 for which the packet transmission priority estimated by the CQI has a predetermined value or less.

In this embodiment, in addition to the effect of the first embodiment of the present invention, the mobile station 2 for which the reception quality of the downlink channel is poor, and a packet is transmitted at a low probability during the current state update frame can be set in the suspend state. Hence, the power consumption of the mobile station 2 can be reduced.

Figure 11:
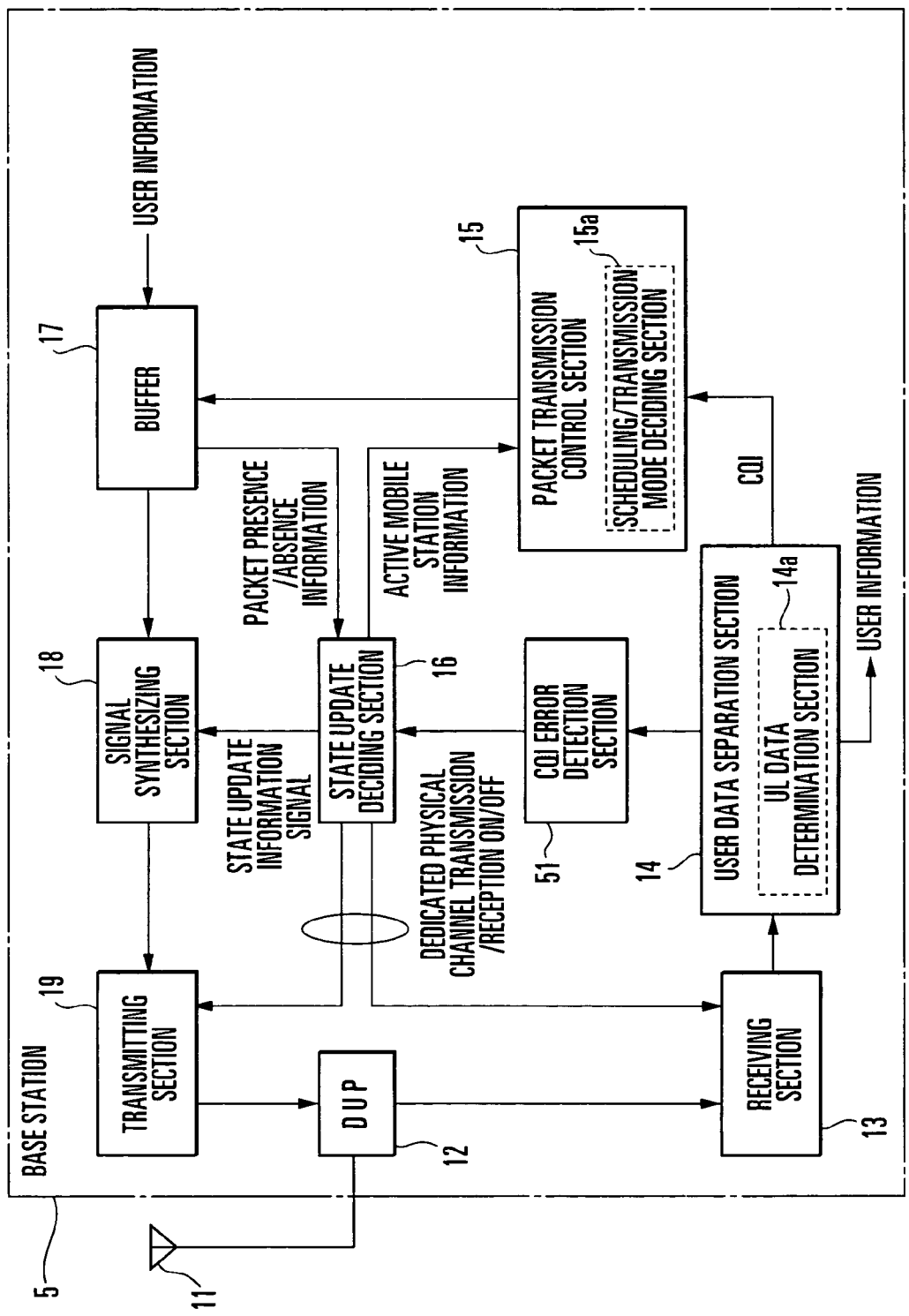
FIG. 11 is a block diagram showing the arrangement of a base station according to the third embodiment of the present invention.

The arrangement of a base station according to the third embodiment of the present invention will be described with reference to FIG. 11.

A base station 5 according to the third embodiment of the present invention further comprises a CQI error detection section 51 which is connected to a state update deciding section 16 and user data separation section 14. A CQI is sent from the user data separation section 14 to the CQI error detection section 51.

Except the above point, the remaining components have the same arrangement as that of the base station 1 according to the first embodiment of the present invention shown in FIG. 2. The same reference numerals as in FIG. 2 denote the same constituent elements in FIG. 11. The operations of the same constituent elements except the user data separation section 14 and state update deciding section 16 are the same as in the first embodiment of the present invention.

The CQI error detection section 51 executes error detection for the CQI from the user data separation section 14 and sends the detection result to the state update deciding section 16.

The state update deciding section 16 also uses the CQI error detection result by the CQI error detection section 51. The state update deciding section 16 decides on the basis of the CQI error detection result and the presence/absence information of a packet temporarily stored in a buffer 17 whether a mobile station 2 is to be set in the active state or suspend state.

In accordance with the decision result, the state update deciding section 16 sends active mobile station information to a packet transmission control section 15, a state update information signal (state update information to the mobile station 2) to a signal synthesizing section 18, and a dedicated physical channel transmission/reception ON/OFF signal to a receiving section 13 and transmitting section 19.

With the above-described characteristic feature, in the third embodiment of the present invention, the base station 5 determines the CRC (Cyclic Redundancy Check) added to the CQI, preferentially selects the mobile station 2 that has received the state update information without any error, and notifies the mobile station 2 of the change to the active state.

In this embodiment, in addition to the effect of the first embodiment, the mobile station 2 which can appropriately select the transmission mode (TFRC) is preferentially set in the active state. The mobile station 2 that has failed to receive the CQI is set in the suspend state. Accordingly, the ratio of the time of the suspend state in the mobile station 2 is increased.

In this embodiment, when the number of mobile stations to which the active notification can be transmitted is limited, the mobile station 2 which can appropriately select the transmission mode can be preferentially set in the active state. For this reason, the transmission efficiency can be increased.

When the transmission power of each channel is controlled by the TPC (Transmit Power Control) bit in the DPCCH (DL/UL), the DPCCH (DL/UL) must be transmitted/received as a pair.

However, the base station cannot stop transmitting the DPCCH (DL) because the mobile station has no timing information of transmission of dedicated physical channel data. Hence, the mobile station cannot stop transmitting/receiving the DPCH and consumes the terminal power. The TPC bit is the transmission power control information of the channel.

In the fourth embodiment of the present invention, to solve the above problem, the mobile station transmits dedicated physical channel data at a predetermined timing so that the base station can determine whether DPCCH transmission/reception can be stopped. If no dedicated physical channel data is transmitted/received in the mobile station and base station, DPCCH transmission/reception can be stopped.

Figure 12:
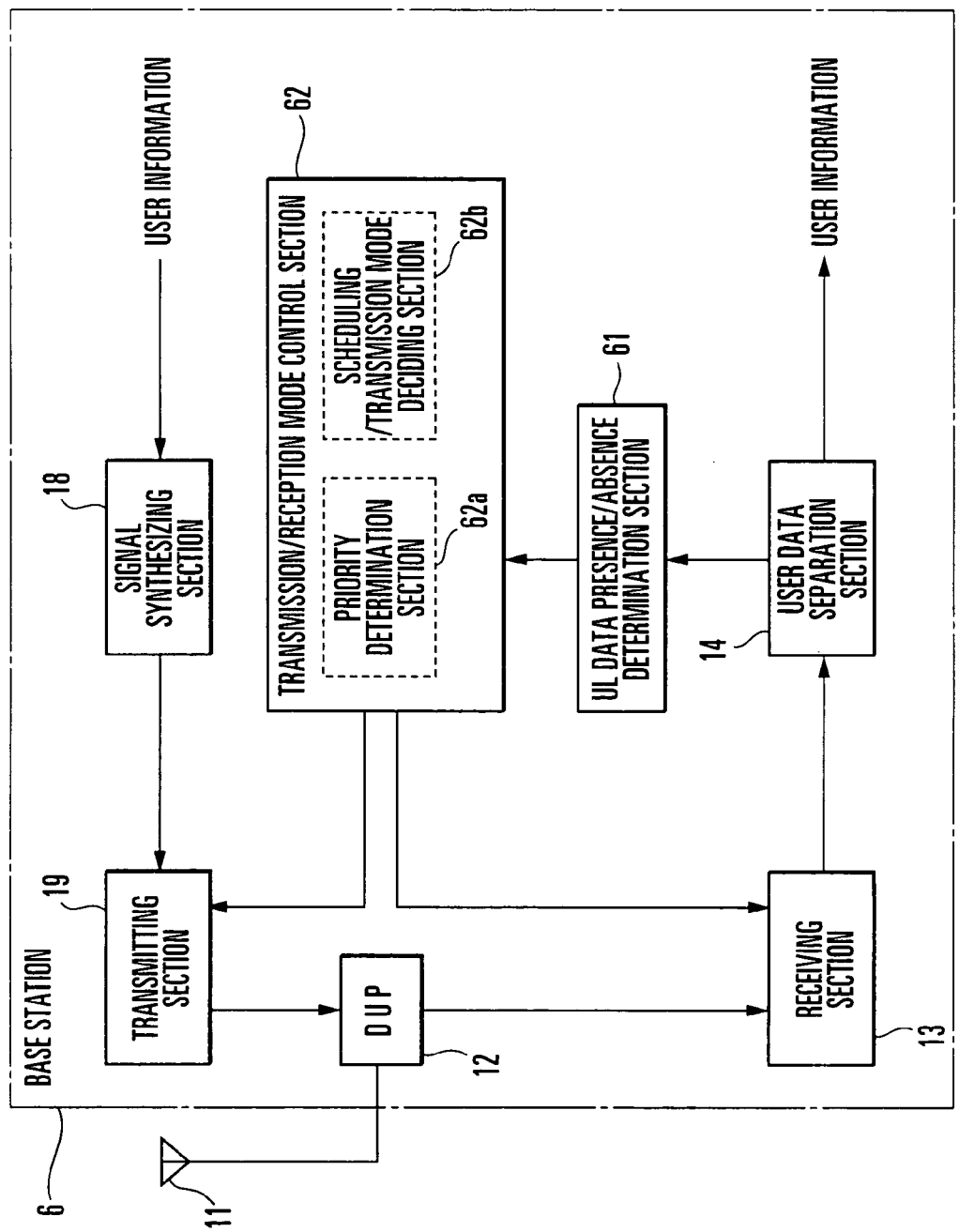
FIG. 12 is a block diagram showing the arrangement of a base station according to the fourth embodiment of the present invention.

The arrangement of a base station according to the fourth embodiment of the present invention will be described with reference to FIG. 12. Referring to FIG. 12, a base station 6 comprises an antenna 11, a transmission/reception duplexer (DUP) 12 connected to the antenna 11, a receiving section 13 connected to the transmission/reception duplexer 12, a user data separation section 14 connected to the receiving section 13, and a UL data presence/absence determination section 61 connected to the user data separation section 14.

The base station 6 also comprises a transmission/reception mode control section 62 connected to the UL data presence/absence determination section 61 and receiving section 13, a signal synthesizing section 18, and a transmitting section 19 connected to the signal synthesizing section 18, transmission/reception mode control section 62, and transmission/reception duplexer 12.

Known techniques can be applied to the call control part, voice input/output part, and display part of the base station 6, and a description of the arrangements and operations thereof will be omitted.

FIG. 12 illustrates only the characteristic portions of the base station 6 according to the fourth embodiment of the present invention.

The receiving section 13 sends, to the user data separation section 14, a signal [DPCH (UL)] received through the antenna 11 and transmission/reception duplexer 12.

The user data separation section 14 separates the reception signal from the receiving section 13 into user information (voice signal, image signal, and the like) and control information [CQI (Channel Quality Indication) (DL)]. The user information is sent to the above-described call control part, voice output part, and display part of the base station 6. The control information is sent to the UL data presence/absence determination section 61.

The UL data presence/absence determination section 61 determines on the basis of the control information from the user data separation section 14 whether UL data from the mobile station is present. The UL data presence/absence determination section 61 sends the determination result to the transmission/reception mode control section 62.

The transmission/reception mode control section 62 has a priority determination section 62a. The transmission/reception mode control section 62 decides the transmission/reception mode [active/suspend] between the base station and the mobile station on the basis of the determination result from the UL data presence/absence determination section 61 and sends the decision result to the receiving section 13 and transmitting section 19. The priority determination section 62a determines a mobile station having a high transmission priority on the basis of the CQI information.

"Active" indicates a state in which the mobile station is set in HSDPA receivable mode. "Suspend" indicates a state in which the mobile station is set in a power consumption saving mode that does not allow HSDPA reception.

The signal synthesizing section 18 synthesizes user information (packet) and a state update information signal and sends them as an HS-SCCH, DPCH (DL), and HS-PDSCH from the antenna 11 through the transmitting section 19 and transmission/reception duplexer 12.

Figure 13:
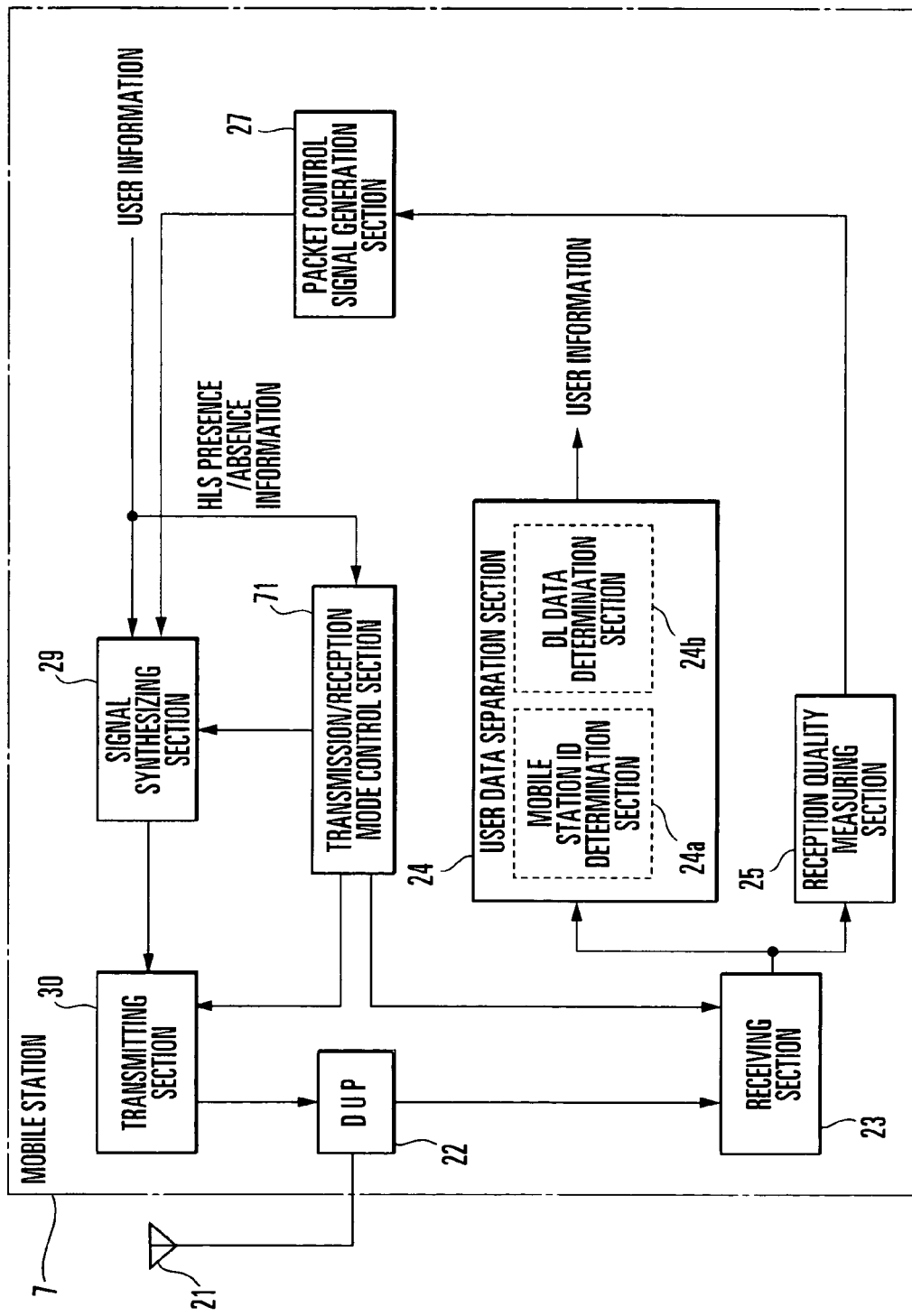
FIG. 13 is a block diagram showing the arrangement of a mobile station according to the fourth embodiment of the present invention.

The arrangement of the mobile station according to the fourth embodiment of the present invention will be described with reference to FIG. 13. Referring to FIG. 13, a mobile station 7 comprises an antenna 21, a transmission/reception duplexer (DUP) 22 connected to the antenna 21, and a receiving section 23 connected to the transmission/reception duplexer 22.

The mobile station 7 also comprises a user data separation section 24 connected to the receiving section 23, a reception quality measuring section 25 connected to the receiving section 23, a packet control signal generation section 27 connected to the reception quality measuring section 25, a transmission/reception mode control section 71 connected to the receiving section 23, a signal synthesizing section 29 connected to the packet control signal generation section 27, and a transmitting section 30 connected to the signal synthesizing section 29, transmission/reception mode control section 71, and transmission/reception duplexer 22.

Known techniques can be applied to the call control part, voice input/output part, and display part of the mobile station 7, and a description of the arrangements and operations thereof will be omitted. FIG. 13 illustrates only the characteristic portions of the mobile station 7 according to the fourth embodiment of the present invention.

The receiving section 23 sends, to the user data separation section 24, a signal [CPICH, DPCH (DL), and HS-PDSCH] received through the antenna 21 and transmission/reception duplexer 22.

The user data separation section 24 separates the reception signal from the receiving section 23 into user information (voice signal, image signal, and the like) and control information. The user information is sent to the above-described call control part, voice output part, and display part of the mobile station 7.

The reception quality measuring section 25 measures the reception quality [Ec/Io (energy per chip/interference wave power per unit frequency)] of the CPICH from the receiving section 23 and outputs the measurement result to the packet control signal generation section 27.

The packet control signal generation section 27 generates a CQI on the basis of the measurement result from the reception quality measuring section 25 and inputs the CQI to the signal synthesizing section 29.

The transmission/reception mode control section 71 decides the transmission/reception mode [active/suspend] between the base station and the mobile station on the basis of the dedicated physical channel data presence/absence information in the user information and sends the decision result to the receiving section 23 and transmitting section 30.

The signal synthesizing section 29 synthesizes an external input signal from the call control part or voice input part of the mobile station 7 and sends it as a DPCH (UL) and HS-DPCCH from the antenna 21 through the transmitting section 30 and transmission/reception duplexer 22.

The operation of the mobile communication system according to the fourth embodiment of the present invention will be described next with reference to FIGS. 12 to 21.

Premises of the fourth embodiment of the present invention are as follows. As conditions of the mobile station 7 to be set in the active state, "a packet to be transmitted to the base station has arrived", and "the transmission priority determined from the CQI is more than a predetermined threshold value".

In this case, to confirm the presence/absence of dedicated physical channel data (HLS shown in FIG. 4) (UL) when the suspend state is designated, a method of "confirming the contents of TFCI by using a format with the TFCI", or if only dedicated physical channel data (DL) is to be transmitted, a method of "sending a notification as the contents of a TFCI by using a format containing the TFCI" is used.

In this embodiment, as active notification reception confirmation, "that the active state is to be set is confirmed by receiving ACK, NACK, or CQI".

Figure 15:
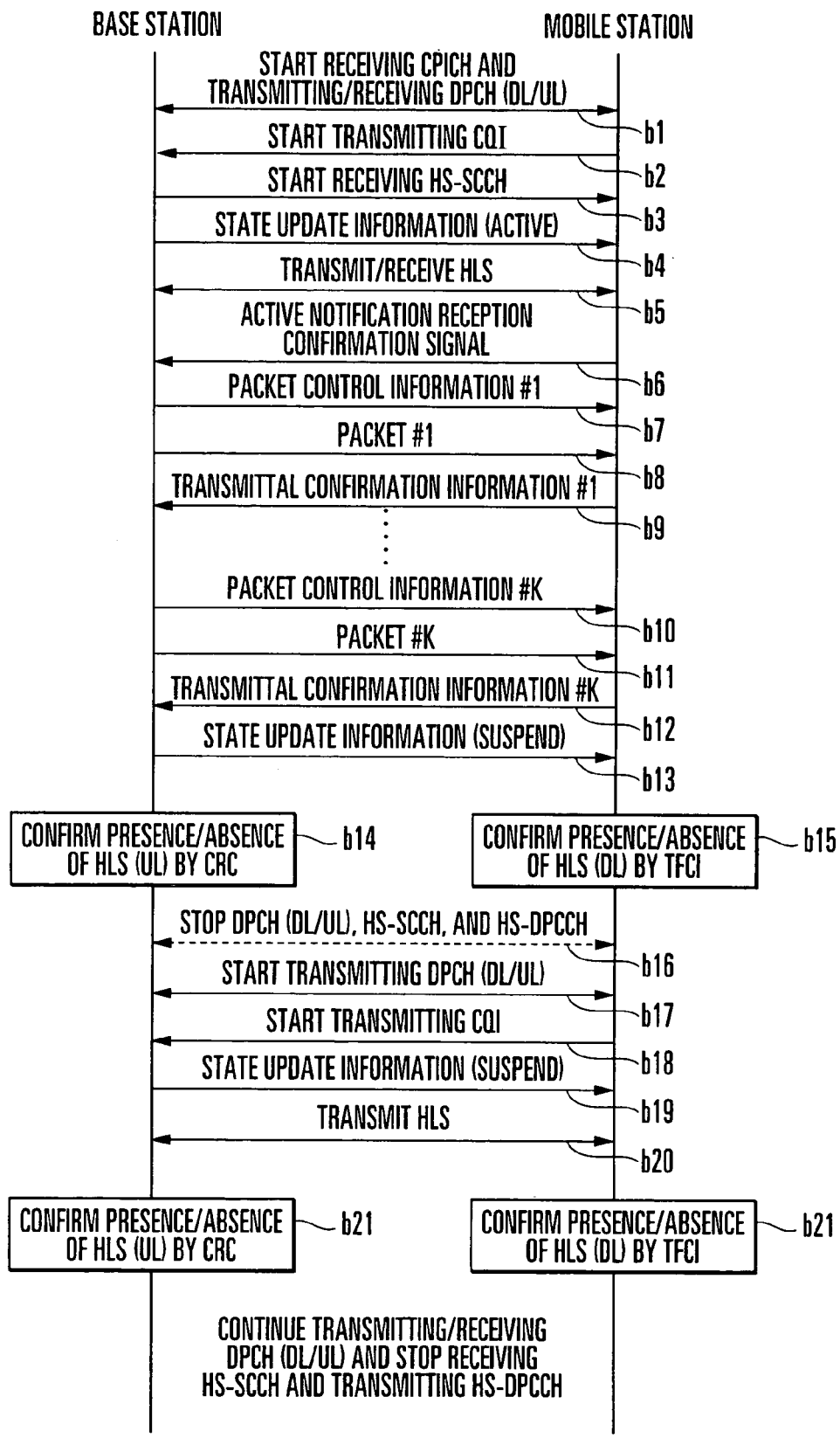
FIG. 15 is a sequence chart showing the operation of the mobile communication system according to the fourth embodiment of the present invention.
Figure 16:
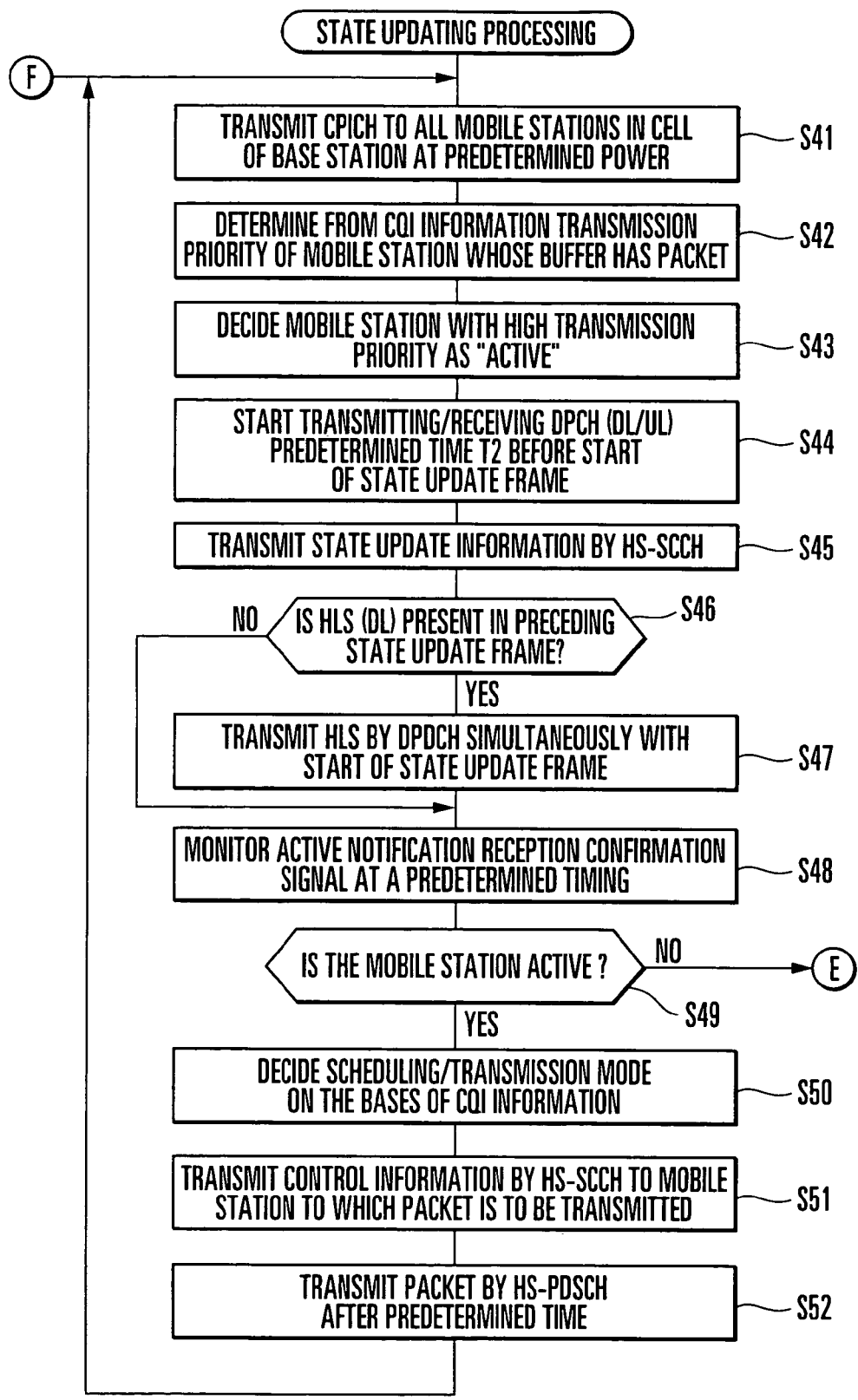
FIG. 16 is a flow chart showing the operation of the base station shown in FIG. 12.
Figure 17:
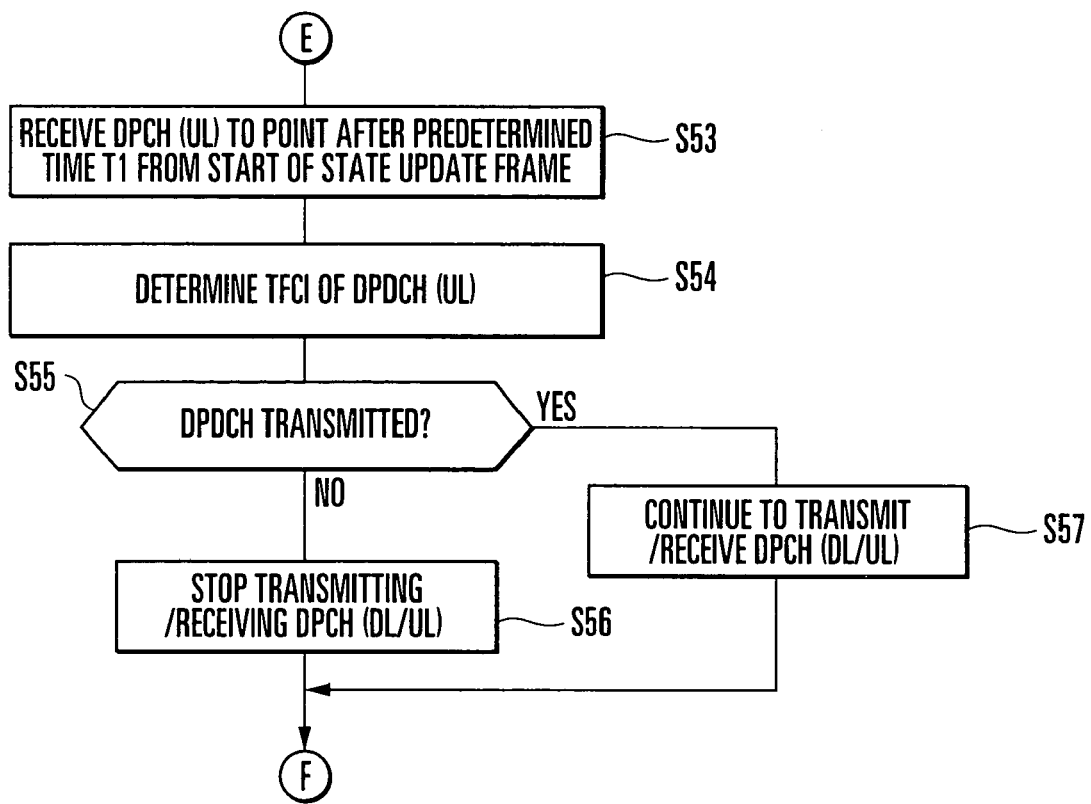
FIG. 17 is a flow chart showing the operation of the base station shown in FIG. 12.

The transmitting section 19 of the base station 6 transmits a CPICH to all mobile stations in the cell managed by the base station 6 at a predetermined power (step S41 in FIG. 16). The transmitting section 30 and receiving section 23 of the mobile station 7 start receiving the CPICH, receiving the DPCH (DL), and transmitting the DPCH (UL) before a predetermined time T2 from the start of the state update frame (step S61 in FIG. 18) (b1 in FIG. 15).

The reception quality measuring section 25 of the mobile station 7 measures the CPICH reception quality and inputs the measurement result to the packet control signal generation section 27. The packet control signal generation section 27 generates CQI information from the received measurement result (step S62 in FIG. 18) and inputs the CQI information to the signal synthesizing section 29. The signal synthesizing section 29 transmits the CQI information by an HS-DPCCH immediately before the start of the state update frame (step S63 in FIG. 18) (b2 in FIG. 15).

Simultaneously with the start of the state update frame, the receiving section 23 of the mobile station 7 starts receiving the HS-SCCH (step S64 in FIG. 18) (b3 in FIG. 15).

The receiving section 13 of the base station 6 starts transmitting the DPCH (DL) and receiving the DPCH (UL) before the predetermined time T2 from the start of the state update frame (step S44 in FIG. 16) (b1 in FIG. 15). Simultaneously, the transmitting section 19 of the base station 6 transmits state update information by the HS-SCCH (step S45 in FIG. 16) (b4 in FIG. 15).

The transmission/reception mode control section 62 of the base station 6 decides a mobile station to be set in the active state by causing the priority determination section 62a to determine a mobile station having a high transmission priority, on the basis of the CQI information, of the mobile stations 7 which are designated as destinations of the packet stored in a buffer (not shown) (steps S42 and S43 in FIG. 16). The transmission/reception mode control section 62 transmits the decision contents as state update information (step S45 in FIG. 16) (b4 in FIG. 15).

The receiving section 23 of the mobile station 7 receives the state update information transmitted at a predetermined timing (step S65 in FIG. 18) (b4 in FIG. 15). When at least one of the conditions, i.e., active designation by the state update information (step S66 in FIG. 18) and the presence of dedicated physical channel data (UL) is satisfied (step S67 in FIG. 18), the transmission/reception mode control section 71 decides the state of the mobile station 7 in this state update frame as "active" (step S68 in FIG. 18).

When dedicated physical channel data is present, both the mobile station 7 and the base station 6 transmit the dedicated physical channel data by the DPDCH simultaneously with the start of the next state update frame. In other words, when dedicated physical channel data (DL/UL) is present in the preceding state update frame (step S46 in FIG. 16 and step S69 in FIG. 18), the base station 6 and the signal synthesizing section 29 of the mobile station 7 transmit the dedicated physical channel data (DL/UL) by the DPDCH simultaneously with the start of the state update frame (step S47 in FIG. 16 and step S70 in FIG. 18) (b5 in FIG. 15).

After this, when the base station 6 instructs "active", and the transmission/reception mode control section 71 of the mobile station 7 decides "active", the transmission/reception mode control section 71 of the mobile station 7 transmits the active notification reception confirmation signal at a predetermined timing by a predetermined control channel (step S71 in FIG. 19) (b6 in FIG. 15) to notify the base station 6 that the mobile station is set in the active state.

Figure 19:
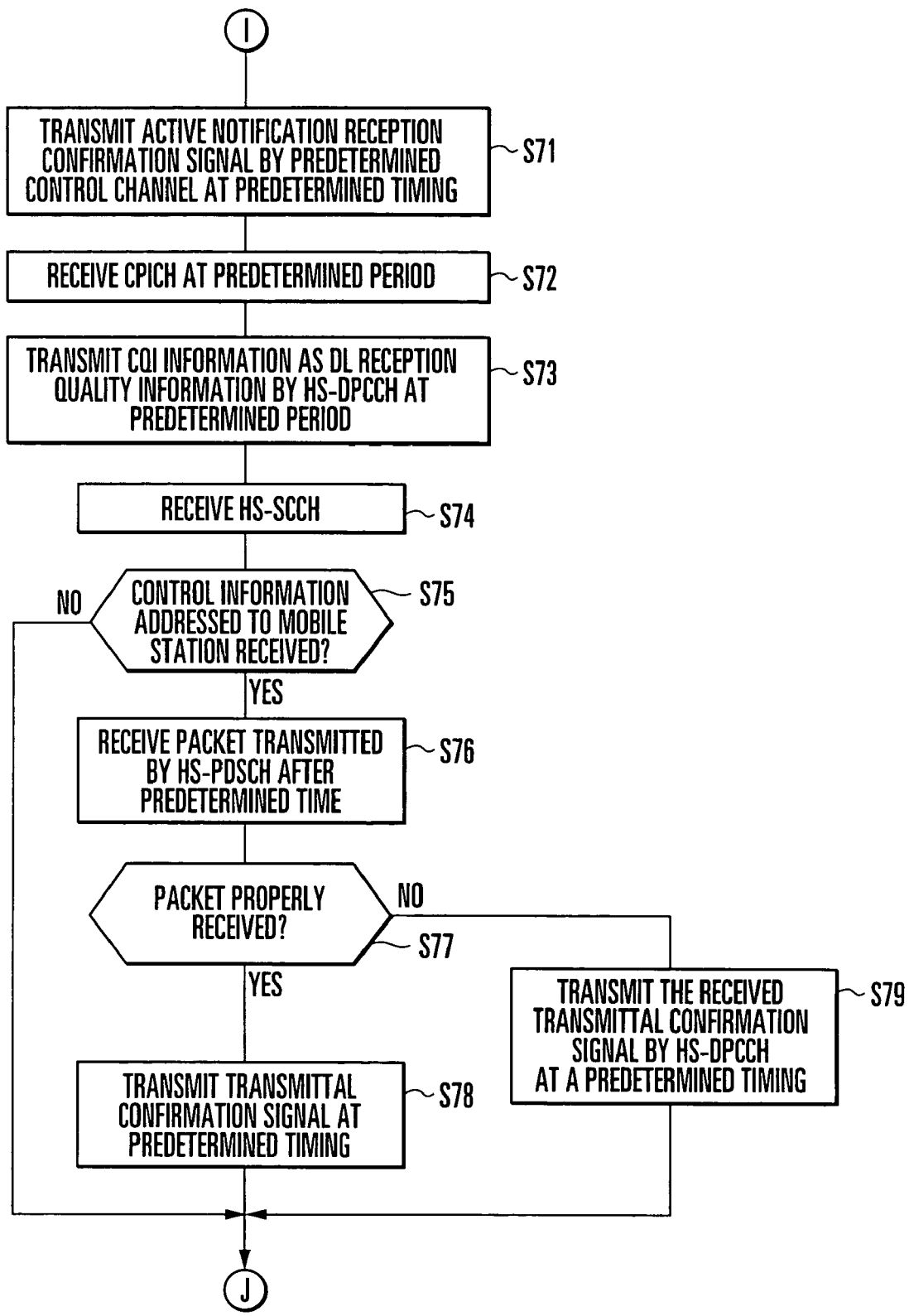
FIG. 19 is a flow chart showing the operation of the mobile station shown in FIG. 13.

The receiving section 23 of the mobile station 7 receives the CPICH at a predetermined period (step S72 in FIG. 19). The signal synthesizing section 29 transmits the CQI, which is DL reception quality information generated by the packet control signal generation section 27, by the HS-DPCCH at a predetermined period (step S73 in FIG. 19).

The base station 6 monitors the active notification reception confirmation signal at a predetermined timing (step S48 in FIG. 16). The transmission/reception mode control section 62 decides the scheduling/transmission mode for the mobile station 7 that has received the active notification reception confirmation signal on the basis of the CQI information of the mobile station 7 (steps S49 and S50 in FIG. 16).

The transmission/reception mode control section 62 of the base station 6 transmits, by the HS-SCCH, control information to the mobile station 7 to which the packet is to be transmitted (step S51 in FIG. 16) (b7 in FIG. 15). After a predetermined time, the transmission/reception mode control section 62 transmits the packet by the HS-PDSCH (step S52 in FIG. 16) (b8 in FIG. 15).

The receiving section 23 of the mobile station 7 receives the HS-SCCH (step S74 in FIG. 19). A mobile station ID determination section 24a determines whether the HS-SCCH is control information addressed to the mobile station that has received the HS-SCCH. When control information addressed to the mobile station is received (step S75 in FIG. 19) (b7 in FIG. 15), the mobile station 7 receives the packet that is transmitted by the HS-PDSCH after a predetermined time (step S76 in FIG. 19) (b8 in FIG. 15).

The packet control signal generation section 27 of the mobile station 7 generates a transmittal confirmation signal that indicates whether the packet is properly received and inputs the signal to the signal synthesizing section 29. The signal synthesizing section 29 transmits the received transmittal confirmation signal by an HS-DPCCH at a predetermined timing (steps S77 to S79 in FIG. 19) (b9 in FIG. 15).

The packet transmission/reception processing is repeatedly executed until the last packet is transmitted/received (b10 to b12 in FIG. 15).

Assume that the base station 6 instructs "suspend", and the transmission/reception mode control section 71 of the mobile station 7 decides "suspend". That is, when the base station 6 receives no active notification reception confirmation signal, and the mobile station 7 determines as "suspend" (step S49 in FIG. 16), the DPCH (UL) is received from the start of the state update frame to a point after a predetermined time T1 (step S53 in FIG. 17). That no DPDCH is transmitted is confirmed by the TFCI contained in the DPCH (steps S54 and S55 in FIG. 17). After that, transmission of the DPCH (DL) and reception of the DPCH (UL) are stopped (step S56 in FIG. 17) (b13, b14, and b16 in FIG. 15).

A scheduling/transmission mode deciding section 62b of the base station 6 does not schedule packet transmission to the mobile station 7 in the state update frame.

Figure 18:
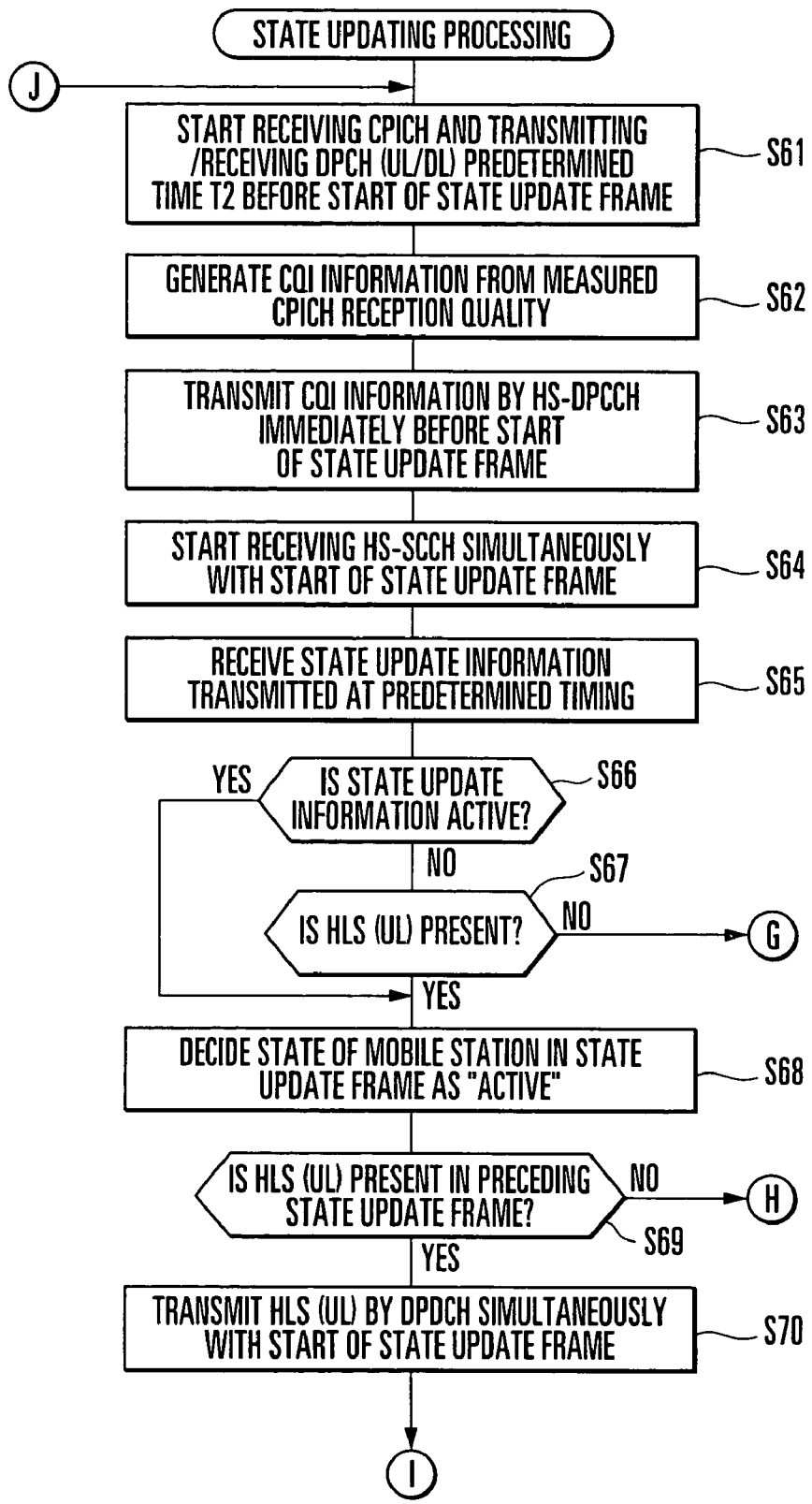
FIG. 18 is a flow chart showing the operation of the mobile station shown in FIG. 13.

Assume that the state update information does not designate "active" (step S66 in FIG. 18), and no dedicated physical channel data (UL) is present (step S67 in FIG. 18). At this time, the transmission/reception mode control section 71 of the mobile station 7 decides the state in this state update frame as "suspend" (step S80 in FIG. 20).

In this case, the transmitting section 30 of the mobile station 7 transmits the DPCCH (UL) from the start of the state update frame to a point after the predetermined time T1 and then stops transmitting the DPCH (UL) (step S81 in FIG. 20) (b16 in FIG. 15).

Figure 20:
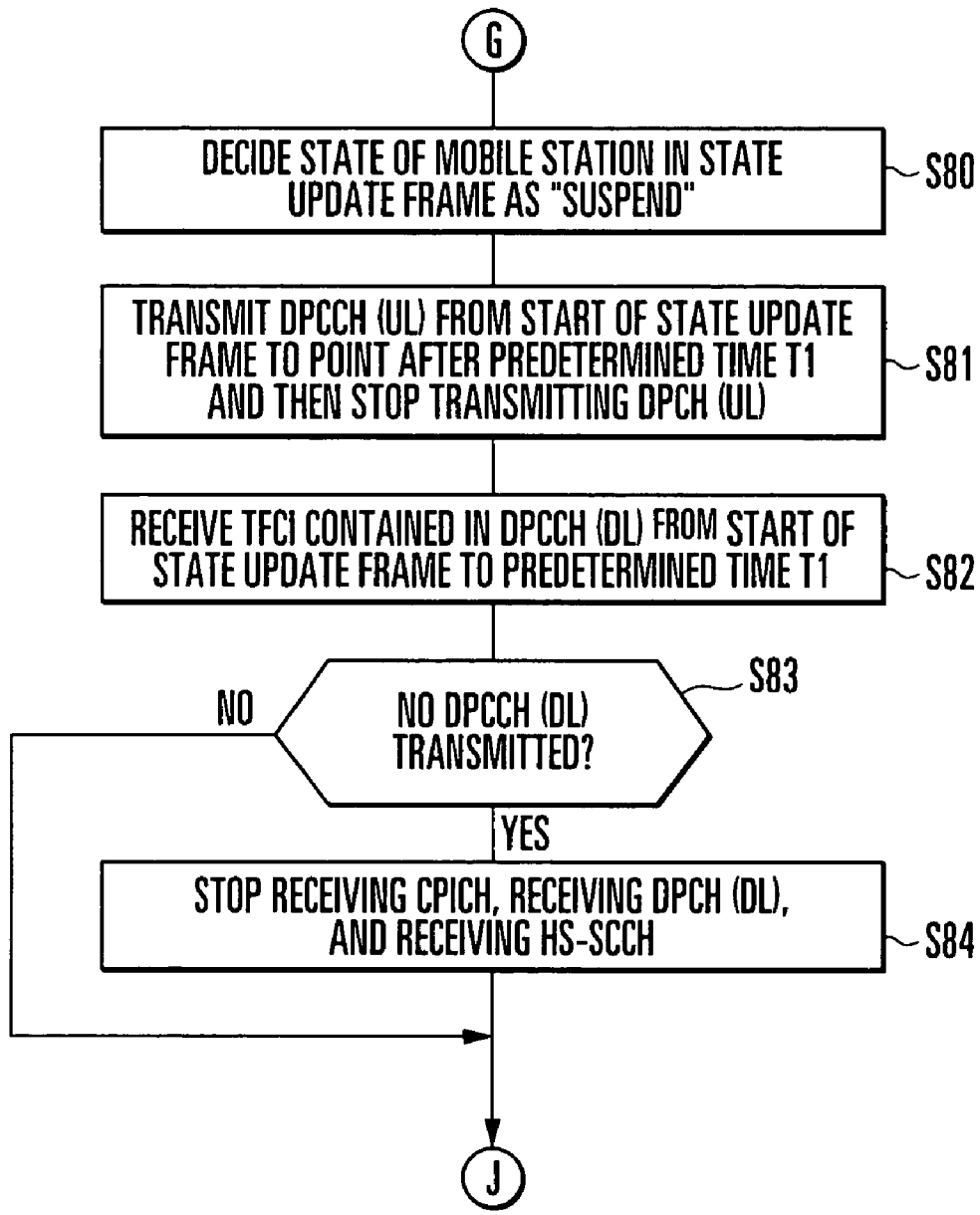
FIG. 20 is a flow chart showing the operation of the mobile station shown in FIG. 13.

The receiving section 23 of the mobile station 7 receives the TFCI contained in the DPCCH (DL) from the start of the state update frame to the predetermined time T1 (step S82 in FIG. 20). The DL data determination section 24b confirms that no DPDCH (DL) is transmitted (step S83 in FIG. 20) (b15 in FIG. 15). After that, the transmission/reception mode control section 71 stops receiving the CPICH, DPCH (DL), and HS-SCCH (step S84 in FIG. 20) (b16 in FIG. 15).

When the base station 6 instructs "suspend", the base station 6 instructs "suspend" (b19 in FIG. 15). Hence, the base station 6 does not receive the active notification reception confirmation signal. The receiving section 13 of the base station 6 receives the DPCH (UL) from the start of the state update frame to a point after the predetermined time T1.

The UL data presence/absence determination section 61 determines the TFCI contained in the DPCCH (UL). If it is confirmed that the DPDCH (UL) is transmitted (steps S54 and S55 in FIG. 17) (b21 in FIG. 15), transmission of the DPCH (DL) and reception of the DPCH (UL) are continued (step S57 in FIG. 17). If it is confirmed by determining the TFCI that no DPDCH (UL) is transmitted (steps S54 and S55 in FIG. 17), transmission of the DPCH (DL) and reception of the DPCH (UL) are stopped after the predetermined time T1.

The scheduling/transmission mode deciding section 62b of the base station 6 does not schedule packet transmission to the mobile station 7 in the state update frame.

When dedicated physical channel data (UL) is present in the preceding state update frame (step S69 in FIG. 18), the mobile station 7 transmits the dedicated physical channel data (UL) by the DPDCH simultaneously with the start of the state update frame (step S70 in FIG. 18) (b20 in FIG. 15) and continues to transmit/receive the DPCH (DL/UL).

Figure 21:
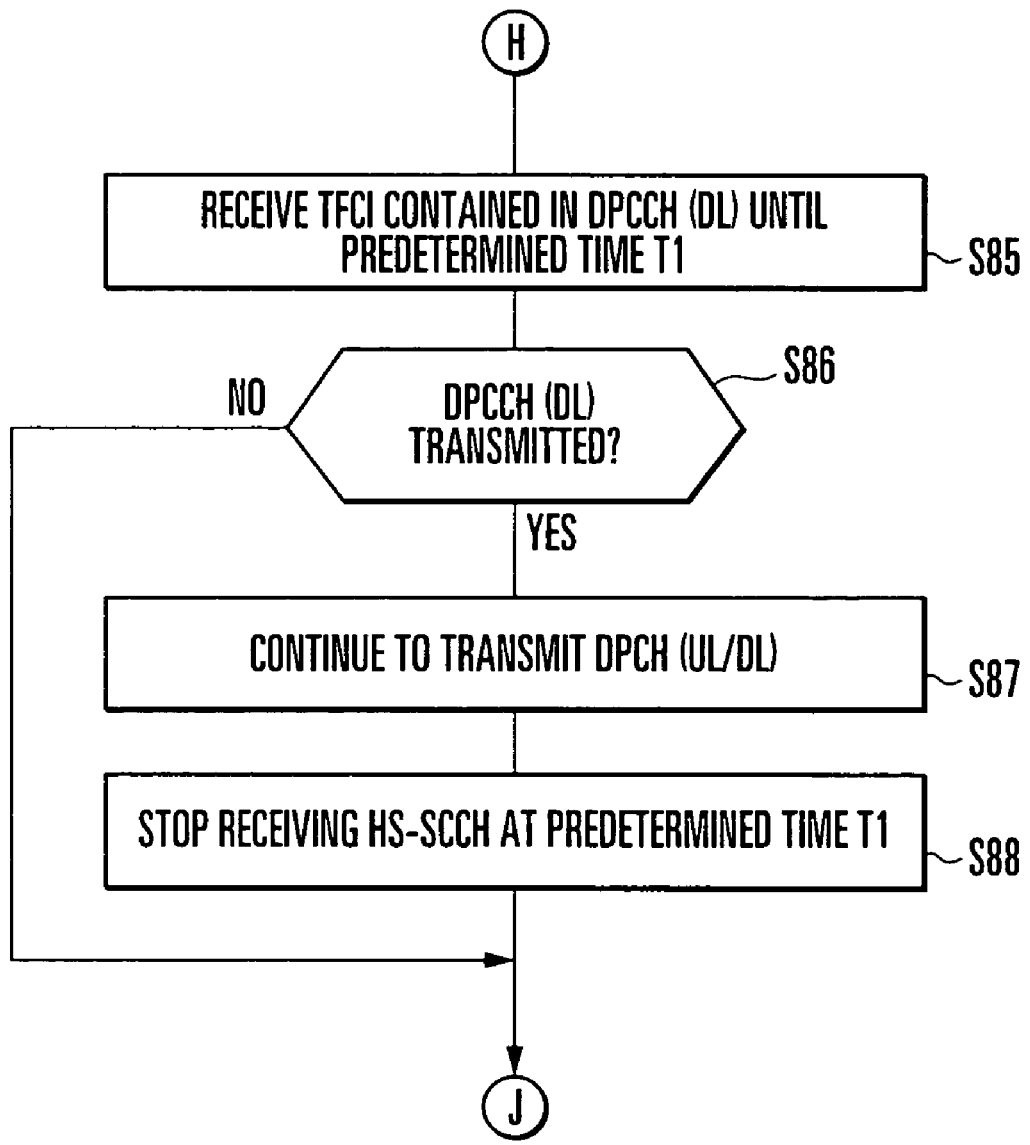
FIG. 21 is a flow chart showing the operation of the mobile station shown in FIG. 13.

Even when the TFCI contained in the DPCCH (DL) is received until the predetermined time T1 (step S85 in FIG. 21), and it is determined that the DPDCH is transmitted (step S86 in FIG. 21) (b22 in FIG. 15), the mobile station 7 continues to receive the DPCH (DL) and transmit the DPCH (UL) (step S87 in FIG. 21).

Figure 14:
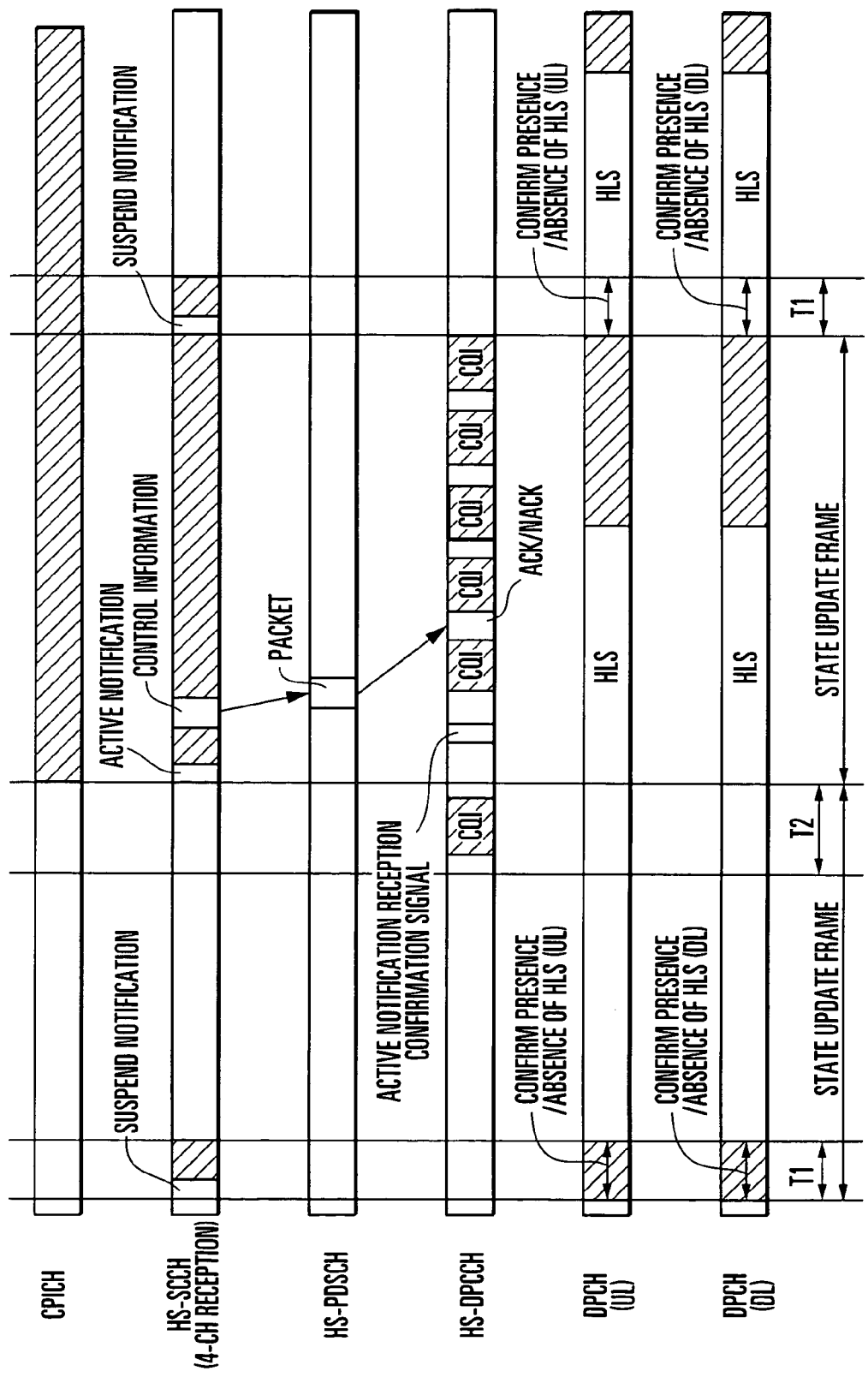
FIG. 14 is a view showing the flow of signals transmitted/received between the base station shown in FIG. 12 and the mobile station shown in FIG. 13.

Except the above-described cases, the mobile station 7 stops transmitting/receiving the DPCH (DL/UL) at the predetermined time T1. In all the above-described cases, the mobile station 7 stops receiving the HS-SCCH at the predetermined time T1 (step S88 in FIG. 21). FIG. 14 shows the flow of the above-described signals.

The operations of the base station 6 and mobile station 7 have been described above. As an exceptional case, a communication error may occur in the propagation channel between the base station 6 and the mobile station 7. More specifically, although the transmission/reception mode control section 62 of the base station 6 instructs "active", an error may be generated in state update information reception by the mobile station 7, and "suspend" may be decided.

In this case, the base station 6 monitors the active notification reception confirmation signal at a predetermined timing. After determining that the mobile station 7 is not in the active state, the base station 6 stops transmitting the DPCH (DL) and receiving the DPCH (UL). The scheduling/transmission mode deciding section 62b does not schedule a packet to the mobile station 7 in this state update frame.

As described above, in this embodiment, the mobile station 7 transmits dedicated physical channel data (UL) at a predetermined timing (simultaneously with the start of the state update frame). Hence, the base station 6 can determine whether DPDCH transmission/reception can be stopped. When no dedicated physical channel data is transmitted/received, DPCH transmission/reception can be stopped. For this reason, the power consumption of the mobile station 7 can be reduced.

In this embodiment, when no dedicated physical channel data is transmitted, transmission of the DPCH (DL) can be stopped. Since the power for transmission can be assigned to the HS-PDSCH, the system throughput can be increased.

In this embodiment, when the base station 6 cannot receive the active notification reception confirmation signal, packet transmission is inhibited. Accordingly, since wasteful packet transmission can be avoided, the system throughput can be increased.

In this embodiment, when the base station 6 executes not packet transmission but only transmission of dedicated physical channel data, the mobile station 7 continues only transmission/reception of the DPCH (UL/DL). Since transmission/reception necessary for only packet transmission can be stopped, the power consumption can be further reduced.

In the fourth embodiment of the present invention, in determining the transmission priority from the CQI information, the priority of the mobile station 7 whose CQI information indicates a satisfactory DL propagation channel condition may be set high. Alternatively, in determining the transmission priority from the CQI information, the priority of the mobile station 7 for which it is determined on the basis of the CRC added to the CQI information that the CQI information can be properly received may be set high.

Figure 22:
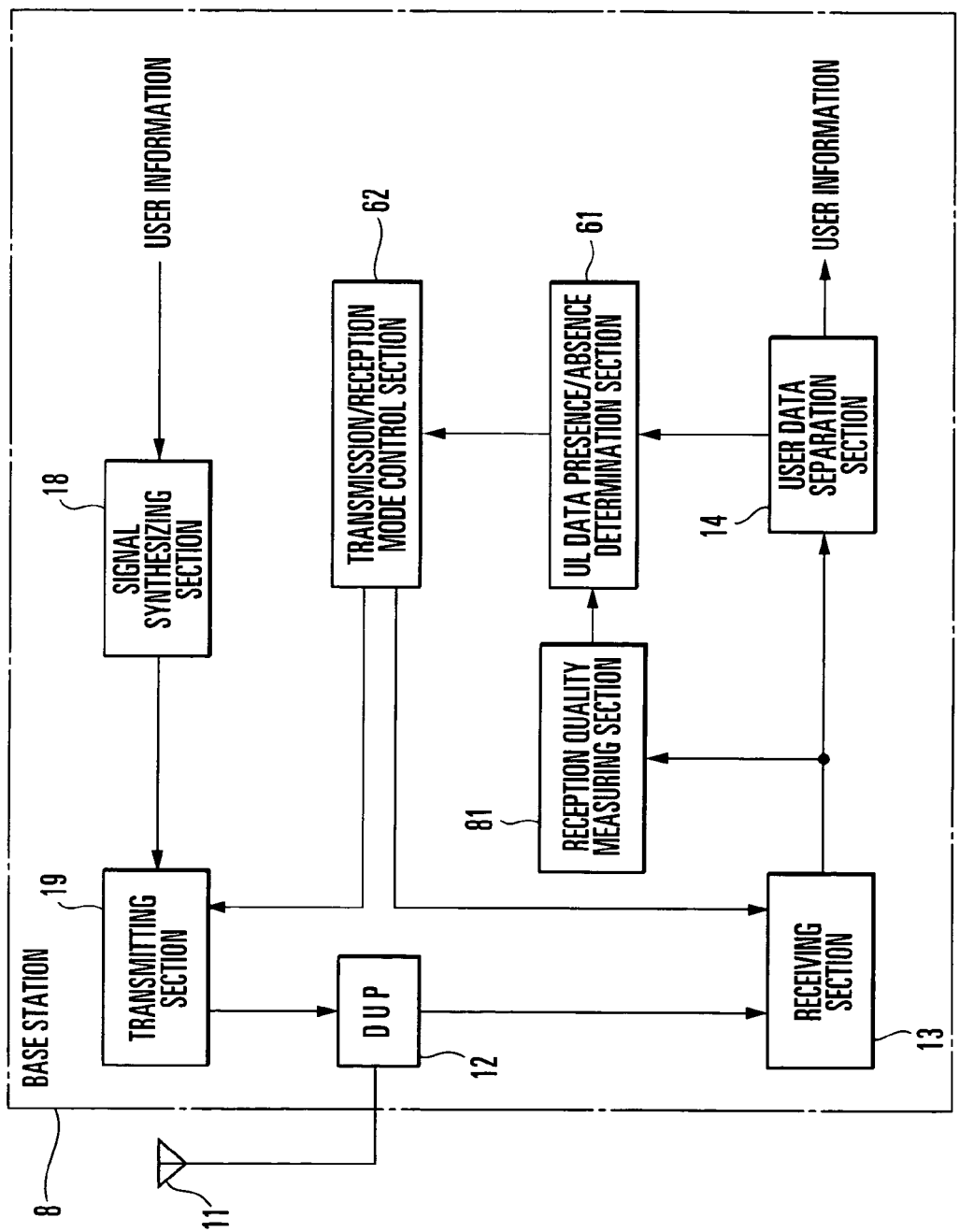
FIG. 22 is a block diagram showing the arrangement of a base station according to the fifth embodiment of the present invention.

The arrangement of a base station according to the fifth embodiment of the present invention will be described with reference to FIG. 22.

A base station 8 according to the fifth embodiment of the present invention has the same arrangement as that of the base station 6 of the fourth embodiment shown in FIG. 12 except that a reception quality measuring section 81 is arranged. The same reference numerals as in FIG. 12 denote the same constituent elements in FIG. 22. The operations of the same constituent elements are the same as in the fourth embodiment.

Figure 23:
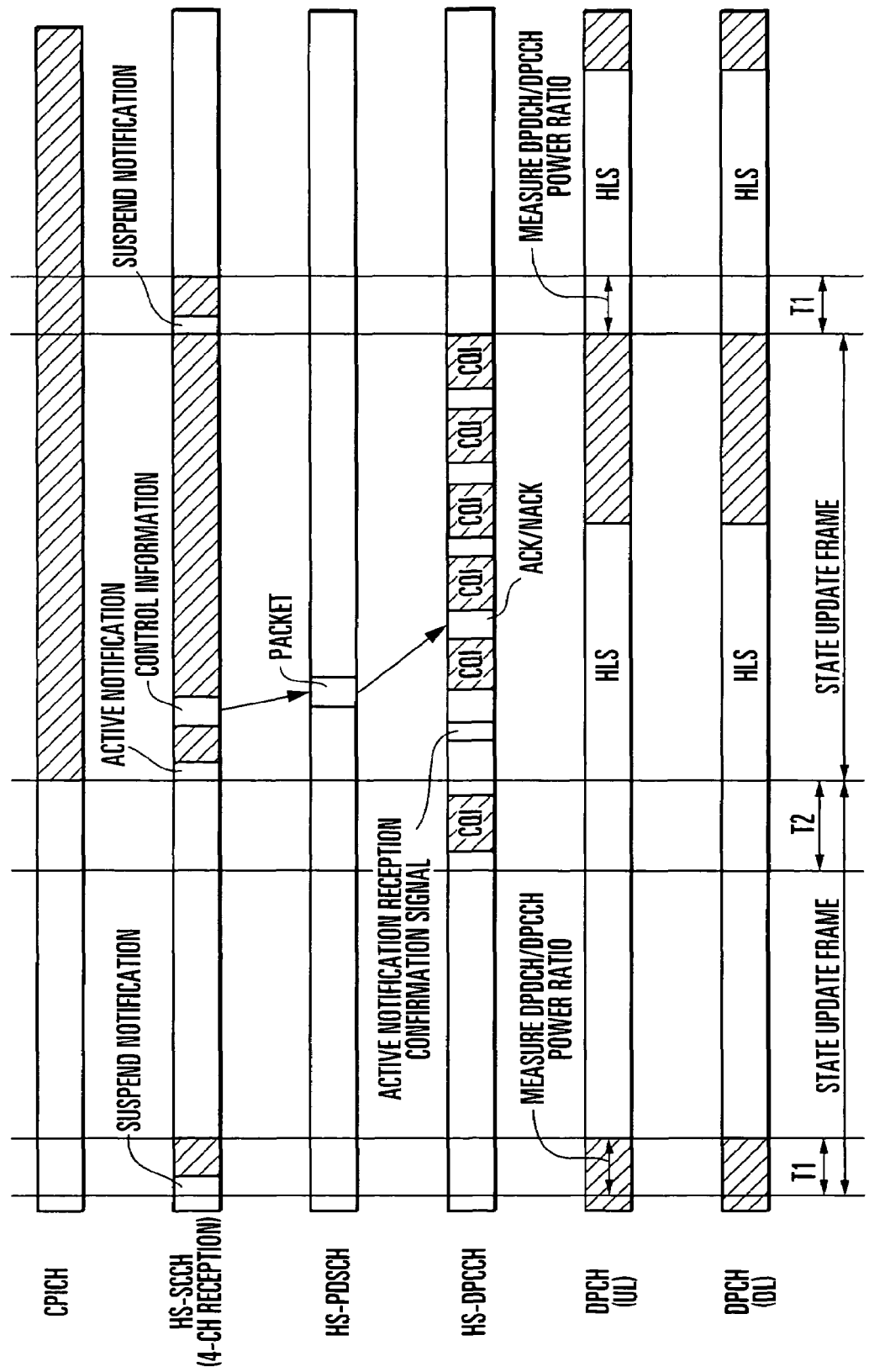
FIG. 23 is a view showing the flow of signals transmitted/received between the base station and mobile station shown in FIG. 22.

The reception quality measuring section 81 measures the power of the DPDCH (UL) and DPCCH (UL) of a DPCH (UL) received by a receiving section 13. The reception quality measuring section 81 calculates the power ratio of DPDCH (UL) and DPCCH (UL) and sends the power ratio to a UL data presence/absence determination section 61 (FIG. 23).

On the basis of control information from a user data separation section 14 and the power ratio of DPDCH (UL) and DPCCH (UL) from the reception quality measuring section 81, the UL data presence/absence determination section 61 determines whether UL data from the mobile station is present. The determination result is sent to a transmission/reception mode control section 62.

The transmission/reception mode control section 62 decides the transmission/reception mode [active/suspend] between the base station and the mobile station on the basis of the determination result from the UL data presence/absence determination section 61 and sends the decision result to the receiving section 13 and a transmitting section 19.

In this embodiment, the effect of the fourth embodiment can be obtained. Additionally, the fifth embodiment can also be applied to a case wherein a slot format containing no TFCI is used in the DPCH (UL).

Figure 24:
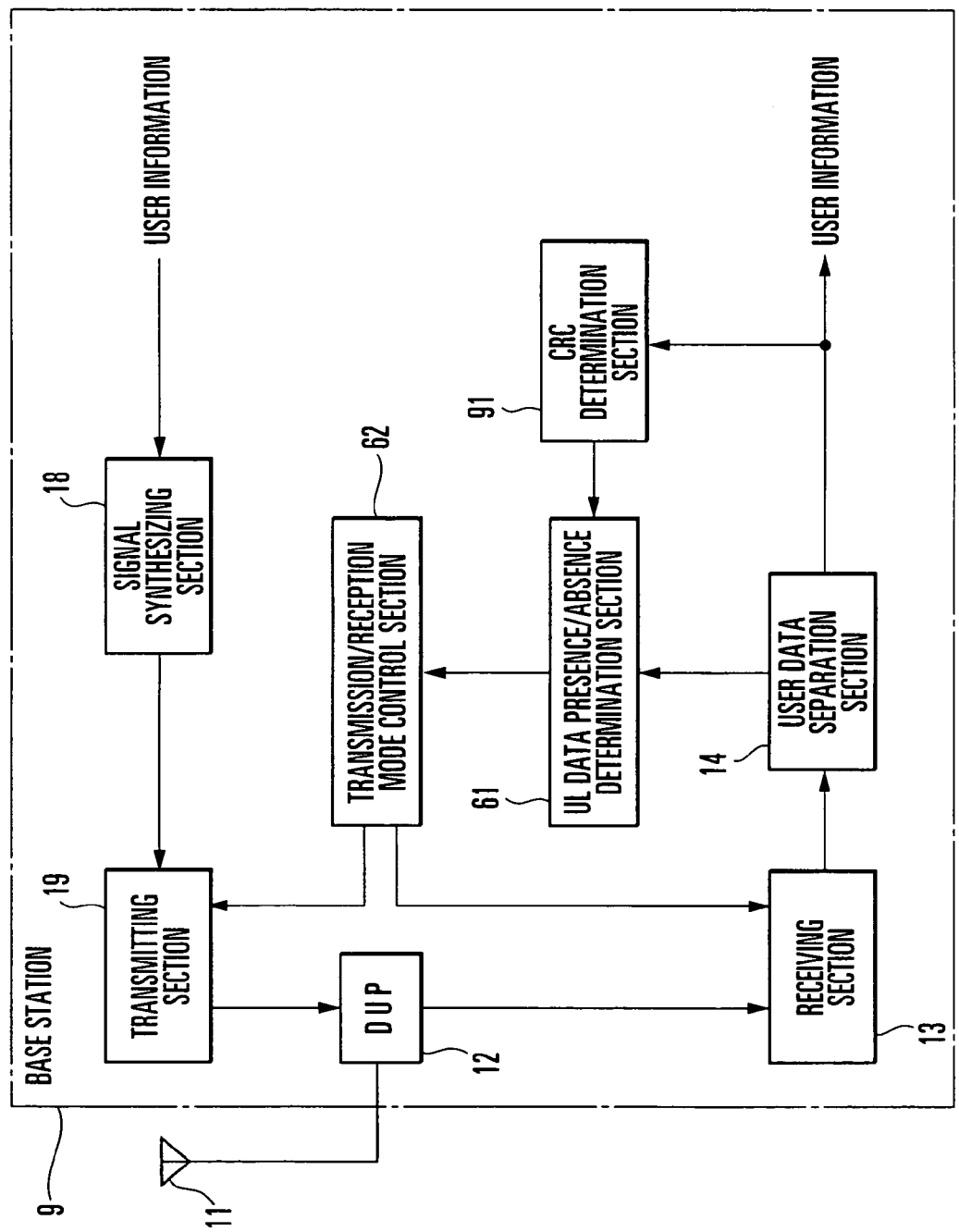
FIG. 24 is a block diagram showing the arrangement of a base station according to the sixth embodiment of the present invention.
Figure 25:
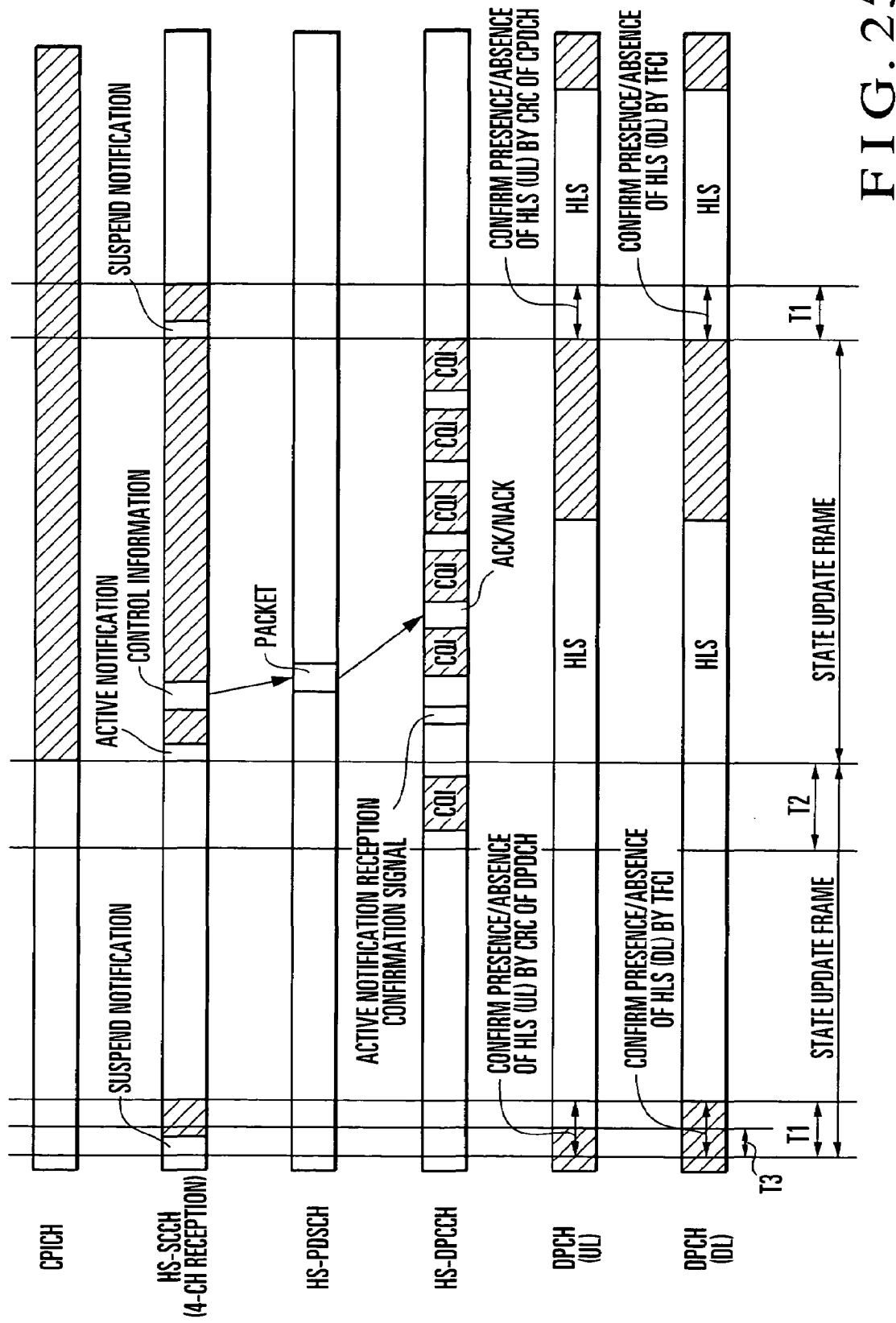
FIG. 25 is a view showing the flow of signals transmitted/received between the base station and mobile station shown in FIG. 24.
Figure 27:
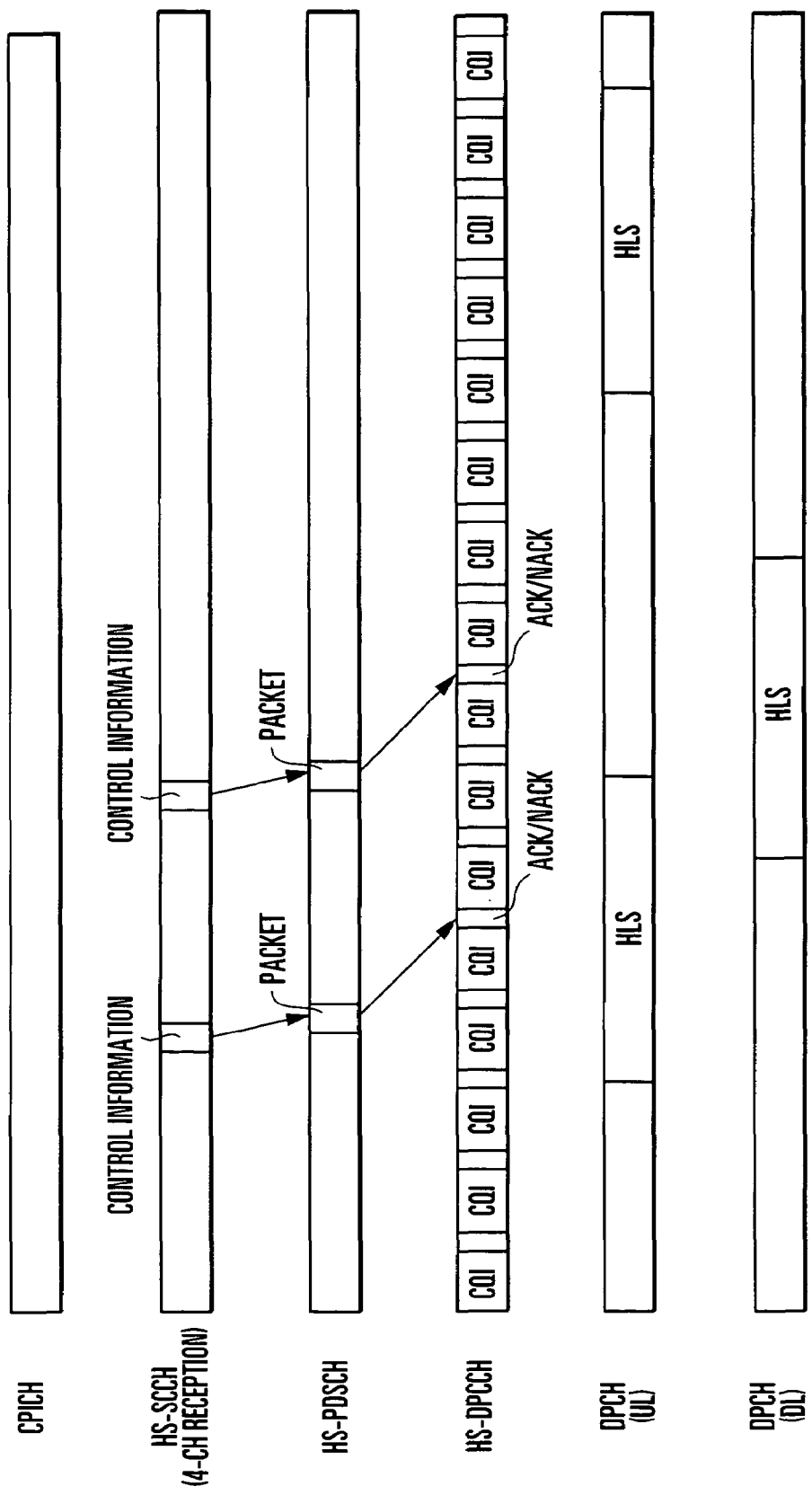
FIG. 27 is a view showing the flow of signals transmitted/received between a base station and mobile station of the prior art.

The arrangement of a base station according to the sixth embodiment of the present invention will be described with reference to FIG. 24.

A base station 9 according to the sixth embodiment has the same arrangement as that of the base station 6 of the fourth embodiment shown in FIG. 12 except that a CRC determination section 91 is arranged. The same reference numerals as in FIG. 12 denote the same constituent elements in FIG. 24. The operations of the same constituent elements are the same as in the fourth embodiment.

A receiving section 13 of the base station 9 receives a DPCH (UL) from the start of a state update frame to a predetermined monitor time T1. A user data separation section 14 separates user information [DPDCH (UL)] from the received signal and inputs the user information to the CRC determination section 91.

The CRC determination section 91 determines the CRC added to the user information [DPDCH (UL)] separated by the user data separation section 14 and sends the determination result to a UL data presence/absence determination section 61.

On the basis of control information from the user data separation section 14 and the CRC determination result from the CRC determination section 91, the UL data presence/absence determination section 61 determines whether transmission of a DPDCH (UL) from the mobile station is present. The determination result is sent to a transmission/reception mode control section 62.

The transmission/reception mode control section 62 decides the transmission/reception mode [active/suspend] between the base station and the mobile station on the basis of the determination result from the UL data presence/absence determination section 61 and sends the decision result to the receiving section 13 and a transmitting section 19.

In this case, when the suspend state is designated, and no dedicated physical channel data to be transmitted is present, the mobile station can stop transmitting/receiving the DPCH (UL/DL) at T3 (T3<T1) from the start of the state update frame.

As described above, in this embodiment, the effect of the fourth embodiment can be obtained. Additionally, when "suspend" is designated, and no dedicated physical channel data to be transmitted is present, transmission/reception of the DPCH (UL/DL) can be stopped before the predetermined monitor time T1 of the base station 9. Hence, in this embodiment, the ratio of the suspend time can be increased, and the power consumption can be reduced.

In the present invention, the channel to transmit the state update information need not always use the HS-SCCH to transmit the HSDPA control information. A dedicated control channel may separately be set.

In the present invention, the active notification reception confirmation signal may be transmitted by using either the HS-DPCCH or another control channel.

The present invention can be applied not only to the HSDPA but also to a two-way channel DCH (Dedicated CHannel) used to transmit user data or a common downlink channel FACH (Forward Access CHannel) used to transmit control information and user data.

That is, the present invention can be applied to packet communication except high-speed packet communication such as the HSDPA service. The present invention is not limited to the above-described embodiments. The above embodiments may be combined.

The present invention can take the following forms in association with the appended claims.

(1) A mobile station, which can receive a packet by receiving control information that notifies the mobile station of packet transmission from a base station, comprises a means for updating a state in accordance with transmission/reception state update information that is transmitted from the base station and received by the mobile station and indicates update of a packet receivable state in the mobile station, wherein one of an active state in which the mobile station can receive control information for packet transmission and a suspend state in which the mobile station cannot receive the control information for packet transmission is set on the basis of the transmission/reception state update information, and when a change instruction to the active state is received, at least one of standby for the packet and transmission/reception of dedicated physical channel data to be transmitted by a dedicated physical channel is started.

(2) In the mobile station of (1), at least one of transmission of dedicated physical channel data and reception of dedicated physical channel data is stopped in the suspend state.

(3) In the mobile station of (1) or (2), the active state is set when the transmission/reception state update information cannot be normally received.

(4) In the mobile station of any one of (1) to (3), when the change instruction to the active state is normally received, a notification reception confirmation signal of the change instruction is transmitted to the base station.

(5) In the mobile station of (4), an existing signal is used as the notification reception confirmation signal.

(6) In the mobile station of (4), a channel quality indication that represents the reception quality of a downlink channel is used as the notification reception confirmation signal.

(7) In the mobile station of (5) or (6), the channel quality indication is transmitted immediately before the transmission/reception state update information is received.

(8) In the mobile station of any one of (1) to (7), the control information for packet transmission/reception is monitored in the active state.

(9) A mobile station, which receives first data from a base station by a first channel, comprises a means for receiving transmission/reception state update information that is transmitted from the base station and indicates update of a first data receivable state, a means for setting, on the basis of the transmission/reception state update information, one of an active state in which the mobile station can receive control information for transmission of the first data and a suspend state in which the mobile station cannot receive the control information for transmission of the first data, and a means for transmitting second data transmitted by a second channel in accordance with a transmission timing of the transmission/reception state update information, wherein the means for transmitting the second data transmits the second data in accordance with the transmission timing of the next transmission/reception state update information after generation of the second data.

(10) In the mobile station of (9), the second channel is transmitted together with a third channel that transmits the control information, and the presence/absence of transmission of the second data is determined by using the control information transmitted by the third channel.

(11) In the mobile station of (10), a transport format combination indication representing the structure of the second channel is used as the information used to determine the presence/absence of transmission of the second data.

(12) In the mobile station of any one of (9) to (11), when the second data to be transmitted at the transmission timing of the second data is not present, transmission of at least one of the third channel and the second channel is stopped at a predetermined timing.

(13) In the mobile station of (9), the second channel is transmitted together with a third channel that transmits the control information, and when the second data to be transmitted is not present, transmission of at least one of the third channel and the second channel is stopped at a predetermined timing.

(14) In the mobile station of any one of (9) to (13), when it is determined that transmission of the second data is not present at the predetermined transmission timing of the transmission/reception state update information, reception of at least one of the second channel and the third channel is stopped at a predetermined timing.

(15) In the mobile station of any one of (10) to (14), in transmitting the second data, transmission/reception of the third channel is continued in a unit frame in which the second data has been transmitted even after the end of transmission of the second data.

(16) A base station, which transmits, to the mobile station, control information that notifies the mobile station of packet transmission so that the mobile station can receive a packet, comprises a means for notifying the mobile station of transmission/reception state update information that indicates update of a packet receivable state in the mobile station, wherein one of an active state in which the mobile station can receive control information for packet transmission and a suspend state in which the mobile station cannot receive the control information for packet transmission is set on the basis of the transmission/reception state update information, and at least one of transmission of dedicated physical channel data and reception of dedicated physical channel data is stopped in the suspend state.

(17) In the base station of (16), if a notification reception confirmation signal of a change instruction, which is transmitted when the change instruction of the active state is normally received by the mobile station, is not received, packet transmission to the mobile station is stopped.

(18) In the base station of (17), the transmission/reception state update information is decided on the basis of a packet transmission priority estimated on the basis of a channel quality indication that is used as the notification reception confirmation signal and represents the reception quality of a downlink channel.

(19) In the base station of (18), the transmission/reception state update information is decided on the basis of the reliability of the channel quality indication.

(20) In the base station of any one of (16) to (19), the means for notifying the mobile station of the transmission/reception state update information notifies the mobile station of the transmission/reception state update information at a predetermined timing set in advance.

(21) A base station, which transmits first data to a mobile station by a first channel, comprises a means for notifying the mobile station of transmission/reception state update information that indicates update of a first data receivable state in the mobile station, and a means for transmitting second data transmitted by a second channel in accordance with the transmission timing of the transmission/reception state update information, wherein one of an active state in which the mobile station can receive control information for transmission of the first data and a suspend state in which the mobile station cannot receive the control information for transmission of the first data is set on the basis of the transmission/reception state update information, and the means for transmitting the second data transmits the second data in accordance with the transmission timing of the next transmission/reception state update information after generation of the second data.

(22) In the base station of (21), the second channel is transmitted together with a third channel that transmits the control information, and the presence/absence of transmission of the second data is determined by using the control information transmitted by the third channel.

(23) In the base station of (21) or (22), a transport format combination indication representing the structure of the second channel is used as the information used to determine the presence/absence of transmission of the second data.

(24) In the base station of (21), the second channel is transmitted together with a third channel that transmits the control information, and the presence/absence of transmission of the second data is determined by using the power ratio of the third channel to the second channel.

(25) In the base station of (21), the second channel is transmitted together with a third channel that transmits the control information, and the presence/absence of transmission of the second data is determined by using an error detection result of at least one of the third channel and the second channel.

(26) In the base station of (21) to (25), when it is determined that transmission of the second data is not present at the predetermined transmission timing of the transmission/reception state update information, reception of at least one of the second channel and the third channel is stopped at a predetermined timing.

(27) In the base station of any one of (21) to (26), in transmitting the second data, transmission/reception of the third channel is continued in a unit frame in which the second data has been transmitted even after the end of transmission of the second data.

(28) A packet communication method for a mobile communication system, in which a mobile station receives control information that notifies the mobile station of packet transmission from a base station so that the mobile station can receive a packet, comprises the step of causing the base station to notify the mobile station of transmission/reception state update information that indicates update of a packet receivable state in the mobile station, wherein one of an active state in which the mobile station can receive control information for packet transmission and a suspend state in which the mobile station can receive the control information for packet transmission is set on the basis of the transmission/reception state update information, and when a change instruction to the active state is received, the mobile station starts at least one of standby for the packet and transmission/reception of dedicated physical channel data to be transmitted by a dedicated physical channel.

(29) In the packet communication method of (28), the mobile station stops at least one of transmission of the dedicated physical channel data and reception of the dedicated physical channel data in the suspend state.

(30) In the packet communication method of (28) or (29), the base station stops at least one of transmission of the dedicated physical channel data and reception of the dedicated physical channel data in the suspend state.

(31) In the packet communication method of any one of (28) to (30), the mobile station is set in the active state when the transmission/reception state update information cannot be normally received.

(32) In the packet communication method of any one of (28) to (31), when the change instruction to the active state is normally received, the mobile station transmits a notification reception confirmation signal of the change instruction to the base station.

(33) In the packet communication method of (32), the mobile station uses an existing signal as the notification reception confirmation signal.

(34) In the packet communication method of (32), the mobile station uses a channel quality indication that represents the reception quality of a downlink channel as the notification reception confirmation signal.

(35) In the packet communication method of any one of (32) to (34), if the notification reception confirmation signal is not received, the base station stops packet transmission to the mobile station.

(36) In the packet communication method of (34) or (35), the mobile station transmits the channel quality indication immediately before the transmission/reception state update information is received, and the base station decides the transmission/reception state update information on the basis of a packet transmission priority estimated on the basis of a channel quality indication.

(37) In the packet communication method of any one of (34) to (36), the base station decides the transmission/reception state update information on the basis of the reliability of the channel quality indication.

(38) In the packet communication method of any one of (28) to (37), the mobile station monitors the control information for packet transmission/reception in the active state.

(39) In the packet communication method of any one of (28) to (38), the means for notifying the mobile station of the transmission/reception state update information notifies the mobile station of the transmission/reception state update information at a predetermined timing set in advance.

(40) A packet communication method for a mobile communication system in which first data is transmitted from a base station to a mobile station, comprises causing the base station to notify the mobile station of transmission/reception state update information that indicates update of a first data receivable state in the mobile station, causing the base station and the mobile station to transmit second data transmitted by a second channel in accordance with the transmission timing of the transmission/reception state update information, and causing the mobile station to set, on the basis of the transmission/reception state update information, one of an active state in which the mobile station can receive control information for transmission of the first data and a suspend state in which the mobile station cannot receive the control information for transmission of the first data, wherein a means for transmitting the second data transmits the second data in accordance with the transmission timing of the next transmission/reception state update information after generation of the second data.

(41) In the packet communication method of (40), the second channel is transmitted together with a third channel that transmits control information, and the base station and the mobile station determine the presence/absence of transmission of the second data by using the control information transmitted by the third channel.

(42) In the packet communication method of (41), a transport format combination indication representing the structure of the second channel is used as the information used to determine the presence/absence of transmission of the second data.

(43) In the packet communication method of (40), the second channel is transmitted together with a third channel that transmits the control information, and the presence/absence of transmission of the second data is determined by using the power ratio of the third channel to the second channel.

(44) In the packet communication method of any one of (40) to (42), when the second data to be transmitted at the transmission timing of the second data is not present, the mobile station stops transmitting at least one of the third channel and the second channel at a predetermined timing.

(45) In the packet communication method of (40), the second channel is transmitted together with a third channel that transmits control information, when the second data to be transmitted is not present, the mobile station stops transmitting at least one of the third channel and the second channel at a predetermined timing, and the base station determines the presence/absence of transmission of the second data by using an error detection result of at least one of the third channel and the second channel.

(46) In the packet communication method of (40) to (45), when it is determined that transmission of the second data is not present at the predetermined transmission timing of the transmission/reception state update information, the base station and the mobile station stop receiving at least one of the second channel and the third channel at a predetermined timing.

(47) In the packet communication method of any one of (41) to (46), in transmitting the second data, the base station and the mobile station continue transmission/reception of the third channel in a unit frame in which the second data has been transmitted even after the end of transmission of the second data.

As has been described above, in a mobile communication system of the present invention, control information that notifies a mobile station of transmission of a packet is transmitted from a base station to the mobile station so that the mobile station can receive a packet. Transmission/reception state update information that indicates update of a packet receivable state and dedicated physical channel data transmissible/receivable state in the mobile station is transmitted to the mobile station at a predetermined timing set in advance. When at least one of a packet and dedicated physical channel data is transmitted to the mobile station, a change instruction to an active state in which the mobile station can receive a packet and dedicated physical channel data is transmitted in a unit frame that is set in advance as the transmission/reception state update information.

Accordingly, a packet can quickly be transmitted in response to a data transmission request while reducing power consumption in a standby state for a packet.

In another mobile communication system of the present invention, control information that notifies a mobile station of transmission of a packet is transmitted from a base station to the mobile station so that the mobile station can receive a packet. Dedicated physical channel data is transmitted at a predetermined timing set in advance in a unit frame set in advance. Accordingly, a packet can quickly be transmitted in response to a data transmission request while reducing power consumption in a standby state for a packet.

More specifically, the mobile communication system of the present invention introduces a state update frame serving as a unit frame that executes state control [active/suspend] of the mobile station at a predetermined period. Only a mobile station that can transmit a packet between the state update frames is set in the active state.

Mobile stations except that in the active state are set in the suspend state to reduce the power consumption of the mobile stations. Each mobile station receives state update information at a timing designated from the network and decides the state in each state update frame.

The active state is a state in which the mobile station can receive a normal HSDPA (High-Speed Downlink Packet Access), i.e., the mobile station can receive control information necessary for packet transmission. In this state, power supplies to all circuits are ON.

The suspend state is a state in which the mobile station cannot receive the HSDPA. In this state, the mobile station is set in the power consumption saving mode wherein power supplies to circuits related to the HSDPA reception are OFF.

In the mobile communication system of the present invention, the mobile station is set in the suspend state except when the mobile station receives a packet or transmits user data or data (to be referred to as dedicated physical channel data hereinafter) such as upper layer control information to be transmitted by a dedicated physical channel. For this reason, the power consumption of the mobile station can be reduced.

Especially, in packet communication, data is transmitted by burst transmission, and the data non-transmission time is long. Hence, a large power consumption reducing effect can be obtained for the mobile station by stopping transmission/reception.

In this embodiment, in the suspend state, the base station stops one or both of DPCH (Dedicated Physical CHannel) (DL: downlink) transmission and DPCH (UL: uplink) reception. Accordingly, the base station reduces the transmission power assigned to the DPCH while increasing the power assigned to the HS-PDSCH (High Speed Physical Downlink Shared CHannel).

Since the transmission power can be assigned to another mobile station, the system throughput can be increased.

The DPCH (DL/UL) is constituted by a DPCCH (Dedicated Physical Control CHannel) and DPDCH (Dedicated Physical Data CHannel).

The DPCCH transmits physical layer control information such as a TPC (Transmit Power Control) bit as the transmission power control information of a paired channel or TFCI (Transport Format Combination Indication) that indicates the structure of DPDCH. The DPDCH transmits dedicated physical channel data.

In the mobile communication system of the present invention, if the mobile station cannot receive transmission/reception state update information, the mobile station is set in the active state so that the base station transmits an active notification. Even when the mobile station fails to receive the notification, a packet can be transmitted/received. Hence, the user throughput can be increased.

In addition, since wasteful packet transmission can also be avoided, the system throughput can be increased.

In the mobile communication system of the present invention, when the base station cannot receive the active notification confirmation signal, packet transmission is inhibited. Accordingly, since wasteful packet transmission can be avoided, the system throughput can be increased.

In the mobile communication system of the present invention, the mobile station transmits the CQI (Channel Quality Indication) immediately before a state update frame. The base station sends a suspend notification to a mobile station for which the packet transmission priority estimated by the CQI has a predetermined value or less.

Accordingly, a mobile station which has a poor downlink channel reception quality and to which a packet is transmitted at a low probability during the current state update frame can be set in the suspend state. For this reason, the power consumption can be reduced.

In the mobile communication system of the present invention, the base station determines a CRC (Cyclic Redundancy Check) added to the CQI, preferentially selects a mobile station that has received the CQI without any error, and notifies the mobile station of the change to the active state.

A mobile station which can appropriately select the transmission mode (TFRC) is preferentially set in the active state. A mobile station that has failed to receive the CQI is set in the suspend state. Accordingly, the ratio of the time of the suspend state is increased.

When the number of mobile stations to which the active notification can be transmitted is limited, a mobile station which can appropriately select the transmission mode can be preferentially set in the active state. For this reason, the transmission efficiency can be increased.

On the other hand, in the mobile communication system of the present invention, the mobile station transmits dedicated physical channel data at a predetermined timing. Hence, the base station can determine whether DPCCH transmission/reception can be stopped. When no dedicated physical channel data is transmitted/received, DPCCH transmission/reception can be stopped. Hence, the power consumption of the mobile station can be reduced.

In the mobile communication system of the present invention, when no dedicated physical channel data is transmitted, transmission of the DPCH (DL) can be stopped. Since the power for transmission can be assigned to the HS-PDSCH, the system throughput can be increased.

What is claimed is:

1. A mobile communication system comprising:
a base station; and
a mobile station,
said mobile station receiving control information that notifies said mobile station of transmission of a packet from said base station so that said mobile station can receive the packet,
wherein said base station comprises:
a base station transmitting/receiving section which transmits/receives the packet to/from said mobile station, and
a base station state updating section which notifies said mobile station of transmission/reception state update information that indicates update of a packet receivable state in said mobile station, and
said mobile station comprises:
a mobile station transmitting/receiving section which transmits/receives the packet to/from said base station,
a mobile station state updating section which sets, on the basis of the transmission/reception state update information, one of an active state in which the control information for packet transmission can be received and a suspend state in which the control information for packet transmission cannot be received, and
a mobile station ID determination section which detects information of a mobile station ID contained in a shared control channel and determines whether the mobile station ID coincides with a reception mobile station ID of said mobile station that has received the shared control channel.

2. A system according to claim 1, wherein when said mobile station state updating section receives a change instruction to the active state, said mobile station transmitting/receiving section starts at least one of standby for the packet and transmission/reception of dedicated physical channel data to be transmitted by a dedicated physical channel.

3. A system according to claim 2, wherein when said mobile station state updating section receives a change instruction to the suspend state, said mobile station transmitting/receiving section stops at least one of transmission of the dedicated physical channel data and reception of the dedicated physical channel data.

4. A system according to claim 1, wherein when said base station is in the suspend state, said base station transmitting/receiving section stops at least one of transmission of dedicated physical channel data and reception of the dedicated physical channel data.

5. A system according to claim 1, wherein said mobile station state updating section sets the active state when the transmission/reception state update information cannot be normally received.

6. A system according to claim 1, wherein said mobile station further comprises a packet control signal generation section which, when a change instruction to the active state is normally received, transmits to said base station a notification reception confirmation signal that represents notification confirmation information of the packet of the change instruction.

7. A system according to claim 6, wherein said packet control signal generation section uses a control signal as the notification reception confirmation signal.

8. A system according to claim 6, wherein said packet control signal generation section uses a channel quality indication representing a reception quality of a downlink channel as the notification reception confirmation signal.

9. A system according to claim 6, wherein said mobile station further comprises a reception quality control section which measures a reception quality.

10. A system according to claim 6, wherein said base station further comprises a packet transmission control section which stops transmitting the packet to said mobile station when no notification reception confirmation signal is received.

11. A system according to claim 10, wherein said packet transmission control section transmits a channel quality indication immediately before receiving the transmission/reception state update information, and
said base station state updating section further comprises a priority determination section which decides the transmission/reception state update information on the basis of a packet transmission priority that is estimated on the basis of the channel quality indication.

12. A system according to claim 11, wherein said priority determination section decides the transmission/reception state update information on the basis of a reliability of the channel quality indication.

13. A system according to claim 1, wherein in the active state, said mobile station state updating section monitors the control information for packet transmission/reception.

14. A system according to claim 1, wherein said mobile station state updating section notifies said mobile station of the transmission/reception state update information at a predetermined timing set in advance.

15. A system according to claim 1, wherein said mobile station further comprises
a user data separation section which separates a reception signal into user information and the control information,
a packet reception determination section which determines on the basis of the control information whether the packet is normally received, and
a signal synthesizing section which synthesizes an input signal.

16. A system according to claim 1, wherein said base station further comprises
a user data separation section which separates a reception signal into user information and the control information,
a signal synthesizing section which synthesizes an input signal,
a buffer which temporarily stores the user information, and
a scheduling/transmission mode deciding section which decides scheduling and a transmission mode on the basis of a channel quality indication.

17. A system according to claim 16, further comprising a CRC determination section which determines a CRC added to the user information.

18. A system comprising:
a base station; and
a mobile station,
first data being transmitted from said base station to said mobile station using a first channel,
wherein said base station comprises:
a base station state updating section which notifies said mobile station of transmission/reception state update information that indicates update of a first data receivable state in said mobile station, and
a base station transmitting/receiving section which transmits/receives second data transmitted by a second channel, in accordance with a transmission timing of the transmission/reception state update information, and
said mobile station comprises:
a mobile station state updating section which sets, on the basis of the transmission/reception state update information, one of an active state in which control information for transmission of the first data can be received and a suspend state in which the control information for transmission of the first data cannot be received, and
a mobile station transmitting/receiving section which transmits/receives the second data transmitted by the second channel, in accordance with the transmission timing of the transmission/reception state update information,
wherein said base station transmitting/receiving section and said mobile station transmitting/receiving section transmit the second data by using the second channel together with a third channel that transmits the control information,
said mobile station further comprises a DL data determination section which determines presence/absence of transmission of the second data by using the control information transmitted by the third channel, and
said base station further comprises a UL data determination section which determines presence/absence of transmission of the second data by using the control information transmitted by the third channel.

19. A system according to claim 18, wherein said DL data determination section and said UL data determination section use a transport format combination indication representing a structure of the second channel as the information used to determine the presence/absence of transmission of the second data.

20. A system according to claim 18, wherein said base station transmitting/receiving section and said mobile station transmitting/receiving section transmit the second data by using the second channel together with the third channel that transmits the control information, and
said base station further comprises a UL data presence/absence determination section which determines presence/absence of transmission of the second data by using a power ratio of the third channel to the second channel.

21. A system comprising:
a base station; and
a mobile station,
first data being transmitted from said base station to said mobile station using a first channel,
wherein said base station comprises:
a base station state updating section which notifies said mobile station of transmission/reception state update information that indicates update of a first data receivable state in said mobile station, and
a base station transmitting/receiving section which transmits/receives second data transmitted by a second channel, in accordance with a transmission timing of the transmission/reception state update information, and
said mobile station comprises:
a mobile station state updating section which sets, on the basis of the transmission/reception state update information, one of an active state in which control information for transmission of the first data can be received and a suspend state in which the control information for transmission of the first data cannot be received, and
a mobile station transmitting/receiving section which transmits/receives the second data transmitted by the second channel, in accordance with the transmission timing of the transmission/reception state update information, wherein when the second data to be transmitted at the transmission timing of the second data is not present, said mobile station transmitting/receiving section stops transmitting at least one of the third channel and the second channel at a predetermined timing.

22. A system comprising:

a base station; and a mobile station, first data being transmitted from said base station to said mobile station using a first channel, wherein said base station comprises:

a base station state updating section which notifies said mobile station of transmission/reception state update information that indicates update of a first data receivable state in said mobile station, and a base station transmitting/receiving section which transmits/receives second data transmitted by a second channel, in accordance with a transmission timing of the transmission/reception state update information, and said mobile station comprises:

a mobile station state updating section which sets, on the basis of the transmission/reception state update information, one of an active state in which control information for transmission of the first data can be received and a suspend state in which the control information for transmission of the first data cannot be received, and a mobile station transmitting/receiving section which transmits/receives the second data transmitted by the second channel, in accordance with the transmission timing of the transmission/reception state update information, wherein said base station transmitting/receiving section and said mobile station transmitting/receiving section transmit the second data by using the second channel together with a third channel that transmits the control information, when the second data to be transmitted is not present, said mobile station transmitting/receiving section stops transmitting at least one of the third channel and the second channel at a predetermined timing, and said base station further comprises a CQI error detection section which determines presence/absence of transmission of the second data by using an error detection result of at least one of the third channel and the second channel.

23. A system comprising:

a base station; and a mobile station, first data being transmitted from said base station to said mobile station using a first channel, wherein said base station comprises:

a base station state updating section which notifies said mobile station of transmission/reception state update information that indicates update of a first data receivable state in said mobile station, and a base station transmitting/receiving section which transmits/receives second data transmitted by a second channel, in accordance with a transmission timing of the transmission/reception state update information, and said mobile station comprises:

a mobile station state updating section which sets, on the basis of the transmission/reception state update information, one of an active state in which control information for transmission of the first data can be received and a suspend state in which the control information for transmission of the first data cannot be received, and a mobile station transmitting/receiving section which transmits/receives the second data transmitted by the second channel, in accordance with the transmission timing of the transmission/reception state update information, wherein when it is determined that transmission of the second data is not present at the predetermined transmission timing of the transmission/reception state update information, said base station transmitting/receiving section and said mobile station transmitting/receiving section stop receiving at least one of the second channel and the third channel at a predetermined timing.

24. A system according to claim 18, wherein each of said base station transmitting/receiving section and said mobile station transmitting/receiving section further comprises a transmitting/receiving section which, in transmitting the second data, continues transmission/reception of the third channel in a unit frame in which the second data has been transmitted even after an end of transmission of the second data.

25. A base station comprising:

a transmitting section which transmits control information over a first channel that notifies a mobile station of transmission of a packet so that the mobile station can receive the packet; and a base station state updating section which notifies the mobile station of transmission/reception state update information over the first channel that indicates update of a packet receivable state in the mobile station, so that the mobile station can receive one or more packets over a second channel, wherein the transmission/reception state update information is information which sets the mobile station in one of an active state in which the control information for packet transmission can be received and a suspend state in which the control information for packet transmission cannot be received, and wherein the base station updating section notifies the mobile station of the transmission/reception state update information, irrespective as to a previous point in time when a packet was most recently sent to the mobile station.

* * * * *